(12) United States Patent
Baek et al.

(10) Patent No.: US 11,297,992 B2
(45) Date of Patent: Apr. 12, 2022

(54) ROBOT CLEANER AND METHOD FOR CONTROLLING THE SAME

(71) Applicant: LG Electronics Inc., Seoul (KR)

(72) Inventors: Gwanryong Baek, Seoul (KR); Woochan Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 433 days.

(21) Appl. No.: 16/270,726

(22) Filed: Feb. 8, 2019

(65) Prior Publication Data

US 2019/0246857 A1 Aug. 15, 2019

(30) Foreign Application Priority Data

Feb. 9, 2018 (KR) .................. 10-2018-0016511

(51) Int. Cl.
*A47L 9/28* (2006.01)
*A47L 9/04* (2006.01)
*G05B 19/4155* (2006.01)

(52) U.S. Cl.
CPC .............. *A47L 9/2852* (2013.01); *A47L 9/04* (2013.01); *A47L 9/2826* (2013.01); *A47L 9/2884* (2013.01); *G05B 19/4155* (2013.01); *A47L 2201/04* (2013.01); *G05B 2219/45098* (2013.01)

(58) Field of Classification Search
CPC ...... A47L 2201/04; A47L 9/04; A47L 9/0477; A47L 9/2805; A47L 9/2826; A47L 9/2852; A47L 9/2884; A47L 9/2894; G05B 19/4155; G05B 2219/45098; G05D 1/0219; G05D 2201/0215
See application file for complete search history.

(56) References Cited

U.S. PATENT DOCUMENTS

2017/0156560 A1* 6/2017 Jung .................. A47L 9/2805
2018/0020893 A1* 1/2018 Lee .................... A47L 9/0477
701/28

FOREIGN PATENT DOCUMENTS

| JP | H05-046246 | | 2/1993 |
|---|---|---|---|
| JP | 5891736 | | 3/2016 |
| JP | 2013106820 A | * | 1/2018 |

OTHER PUBLICATIONS

JP-2013106820-A- English Machine Translation (Year: 2018).*
KR 10-2018-0016511 Notice of Allowance dated Oct. 30, 2019.

* cited by examiner

*Primary Examiner* — Marc Carlson
(74) *Attorney, Agent, or Firm* — Birch, Stewart, Kolasch & Birch, LLP

(57) ABSTRACT

A robot cleaner includes a controller configured to sense an obstacle with a sensing unit of the robot cleaner, and control a driving unit of the robot cleaner to move a main body of the robot cleaner forward into a first contact state in which a front end of a cleaning unit cleans a first region while in contact with the obstacle. After the first contact state, the controller controls the driving unit to move the main body according to a predetermined connecting operation into a second contact state in which the front end of the cleaning unit cleans a second region while in contact with the obstacle, the first region and the second region being arranged along an outline of the obstacle.

9 Claims, 27 Drawing Sheets

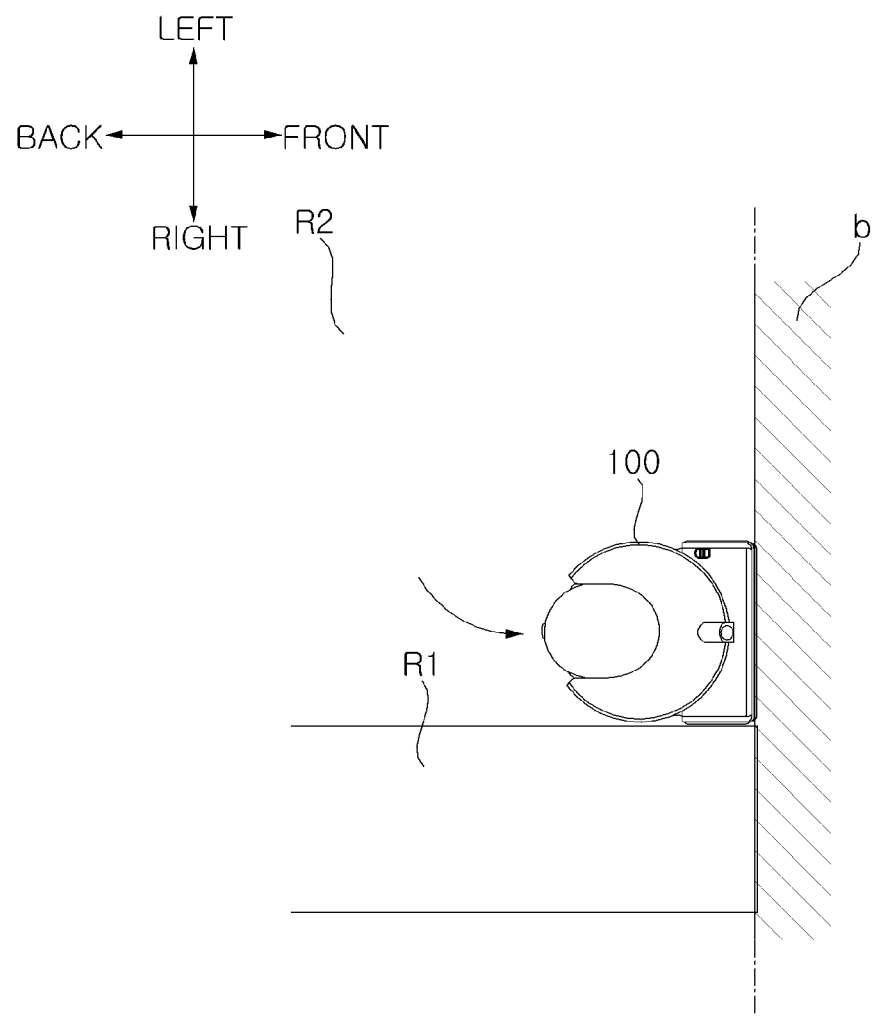

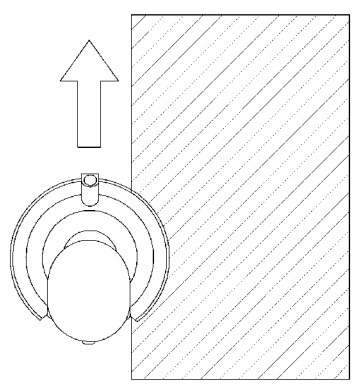 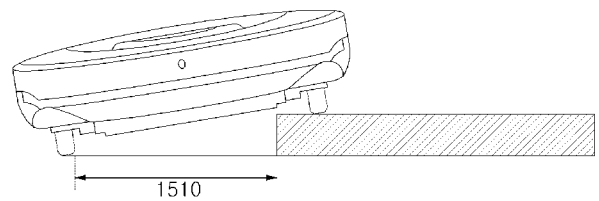
FIG. 16A                    FIG. 16B

ROBOT CLEANER AND METHOD FOR CONTROLLING THE SAME

CROSS-REFERENCE TO RELATED APPLICATION

This application claims the benefit of priority of Korean Patent Application No. 10-2018-0016511, filed on Feb. 9, 2018 in the Korean Intellectual Property Office, the disclosure of which is incorporated herein by reference in its entirety.

BACKGROUND OF THE INVENTION

Field of the Invention

The present invention relates to a robot cleaner and a method for controlling the same, and more particularly to a robot cleaner capable of intensively cleaning dust present between an obstacle and a floor to be cleaned, and a method for controlling the robot cleaner.

Description of the Related Art

In general, a robot has been developed for industry and has taken charge of a portion of factory automation. In recent times, a field that applies the robot has been expanded, a medical robot, a space and aircraft robot, etc. have been developed, and a home robot that may be used at general home is also being made. A typical example of the home robot is a robot cleaner.

The robot cleaner performs a function of cleaning a floor while traveling by itself in a certain area. For example, a robot cleaner is configured to perform a cleaning operation using a predetermined cleaning tool while autonomously traveling an area to be cleaned in a preset travel pattern or in a random pattern.

If there is an obstacle in the area to be cleaned, a conventional robot cleaner moves over the cleaner or follow the boundary of the obstacle.

However, in this case, a considerable amount of dust present at a point where an obstacle and a boundary of a floor to be cleaned cannot be cleaned effectively.

In addition, in the case of traveling with following a boundary of an obstacle while maintaining a predetermined distance from the obstacle by use of a distance sensor, a valid sensing range of the distance sensor is limited and there are errors in sensing the distance. As a result, certain regions between the obstacle and the robot cleaner cannot be cleaned.

SUMMARY OF THE INVENTION

The present invention has been made in view of the above problems, and it is one object of the present invention to provide a robot cleaner capable of intensively cleaning a boundary between an obstacle and a floor to be cleaned, and a method for controlling the robot cleaner.

It is another object of the present invention to provide a robot cleaner capable of minimizing a non-cleaned region between an obstacle and the robot cleaner, and a method for controlling the robot cleaner.

It is also another object of the present invention to provide a robot cleaner capable of efficiently cleaning a boundary between an obstacle and a floor to be cleaned simply by controlling a controller, without the need of coupling cleaning tools or performing any additional cleaning operation, and a method for controlling the robot cleaner.

In accordance with an embodiment of the present invention, the above and other objects can be accomplished by the provision of a robot cleaner including: a main body; a driving unit configured to move the main body; a cleaning unit disposed at a front of the main body and configured to perform cleaning; a sensing unit configured to sense an obstacle around the main body; and a controller configured to: when the sensing unit senses the obstacle, control the driving unit to move the main body forward so that the main body is brought into a first contact state in which a front end of the cleaning unit cleans a first region while in contact with the obstacle, after the first contact state, control the driving unit to move the main body according to a predetermined connecting operation so that the main body is brought into a second contact state in which the front end of the cleaning unit cleans a second region while in contact with the obstacle, and perform control so that the first region and the second region are arranged along an outline of the obstacle.

In accordance with an embodiment of the present invention, the above and other objects can be accomplished by the provision of a method for controlling a robot cleaner, including: sensing, by the robot cleaner, an obstacle around the robot cleaner; when the obstacle is sensed, moving, by the robot cleaner, forward so that a main body of the robot cleaner is brought into a first contact state in which a front end of a suction port of the robot cleaner cleans a first region while in contact the obstacle; after the first contact state, performing, by the robot cleaner, a predetermined connecting operation; moving, by the robot cleaner, forward according to the predetermined connecting operation so that the main body of the robot cleaner is brought into a second contact state in which the front end of the suction port cleans a second region while in contact with the obstacle, wherein the second region partially overlap the first region or the second region is connected to the first region.

The robot cleaner according to an embodiment of the present invention is able to efficiently clean a boundary between an obstacle and a floor to be cleaned since the front of the robot cleaner comes into contact with and moves away from the obstacle, thereby increasing an area to be cleaned compared to the case where a side surface of the robot cleaner comes into contact with and moves away from the obstacle.

When the front surface of the robot cleaner is in contact with the boundary between the obstacle and the floor to be cleaned, a suction force is greater than when a side surface of the robot cleaner is in contact with the boundary. Accordingly, a larger amount of foreign substances may be collected and foreign substance deposited in the boundary may be effectively removed.

In addition, the robot cleaner is capable of intensively removing dust deposited in the boundary between the obstacle and the floor by performing a predetermined connecting operation. In addition, since the connecting operation is performed under control of the controller, it is not necessary to couple additional cleaning tools or perform an additional cleaning operation in order to clean the boundary.

In addition, when an obstacle equal to or lower than a predetermined height, the robot cleaner performs a connecting operation, and therefore, it is possible to prevent a situation where the robot cleaner is constrained by a floor obstacle equal to or greater than the predetermined height and thus unable to move.

In addition, a first region to be cleaned and a second region to be cleaned may be connected or overlap, and thus, a boundary of an obstacle may be cleaned thoroughly.

In addition, if the first region and the second region are connected, an overlapping area to be cleaned may be minimized, thereby possibly reducing power consumption. In addition, if the first region and the second region overlap each other, a boundary of an obstacle may be cleaned more thoroughly.

In addition, the robot cleaner is capable of writing a cleaning map while performing a connecting operation, and the cleaning map may be used to avoid collision with an obstacle and perform avoidance driving while the robot cleaner moves. In particular, after intensive cleaning of a floor boundary, the robot cleaner of the present invention approaches an obstacle again and moves while following the boundary, thereby enabling the robot cleaner to clean the floor boundary along the obstacle more thoroughly.

BRIEF DESCRIPTION OF THE DRAWINGS

The embodiments will be described in detail with reference to the following drawings in which like reference numerals refer to like elements wherein:

FIGS. 9A-9E are diagrams for explanation of a connecting operation shown in FIG. 7;

FIGS. 16A and 16B are diagrams for explanation of obstacle boundary cleaning by a conventional robot cleaner.

DETAILED DESCRIPTION OF THE PREFERRED EMBODIMENTS

Hereinafter, the present invention will be described in more detail with reference to the accompanying drawings.

In the following description, the suffixes "module" and "unit" are used or combined with each other only in consideration of ease in the preparation of the specification, and do not have or serve as different meanings. Accordingly, the suffixes "module" and "unit" may be interchanged with each other.

It will be understood that although the terms "first," "second," etc., may be used herein to describe various components, these components should not be limited by these terms. These terms are only used to distinguish one component from another component.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

Figure 1:
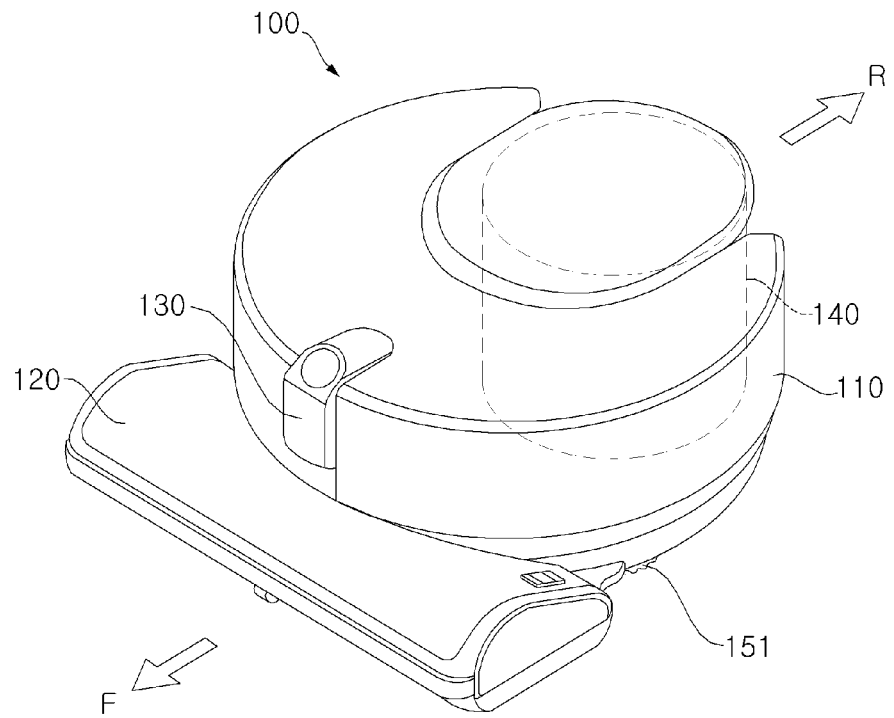
FIG. 1 is a perspective view showing a robot cleaner according to an embodiment of the present invention.
Figure 2:
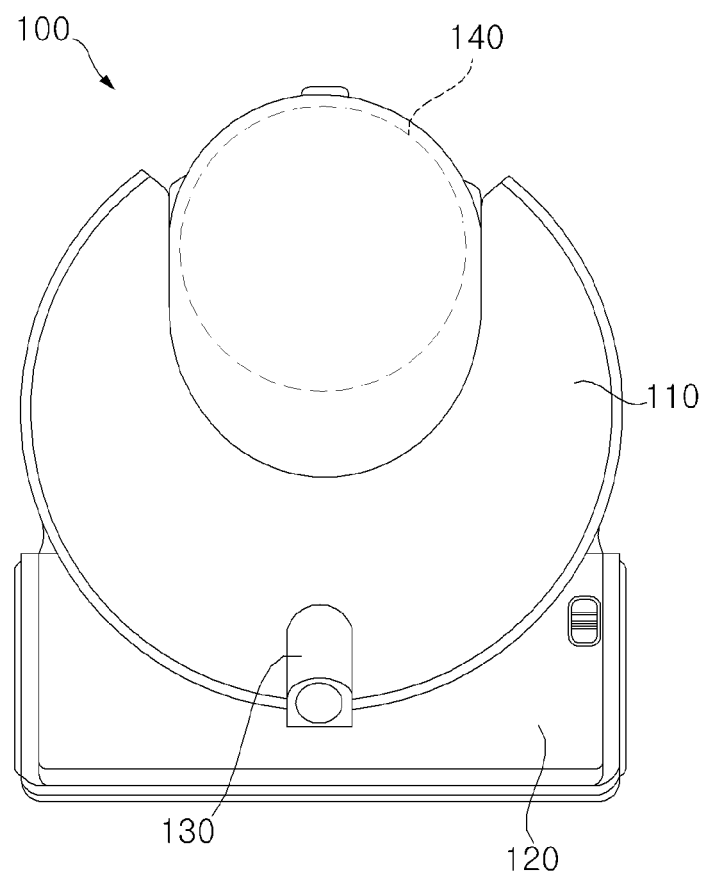
FIG. 2 is a plan view of the robot cleaner shown in FIG. 1.
Figure 3:
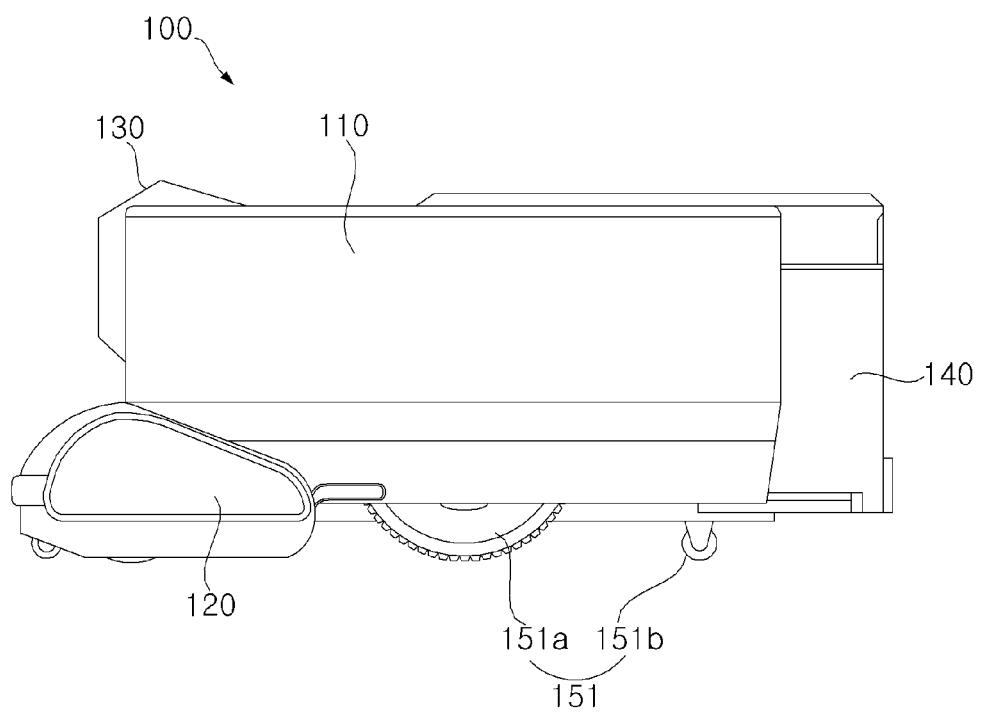
FIG. 3 is a side view of the robot cleaner shown in FIG. 1.
Figure 4:
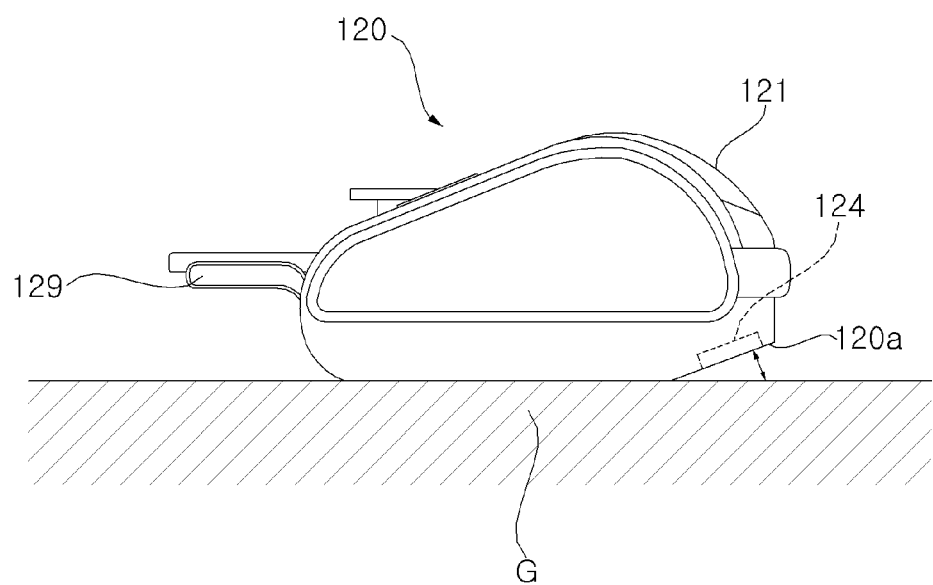
FIG. 4 is a side view of a cleaning unit shown in FIG. 1.
Figure 5:
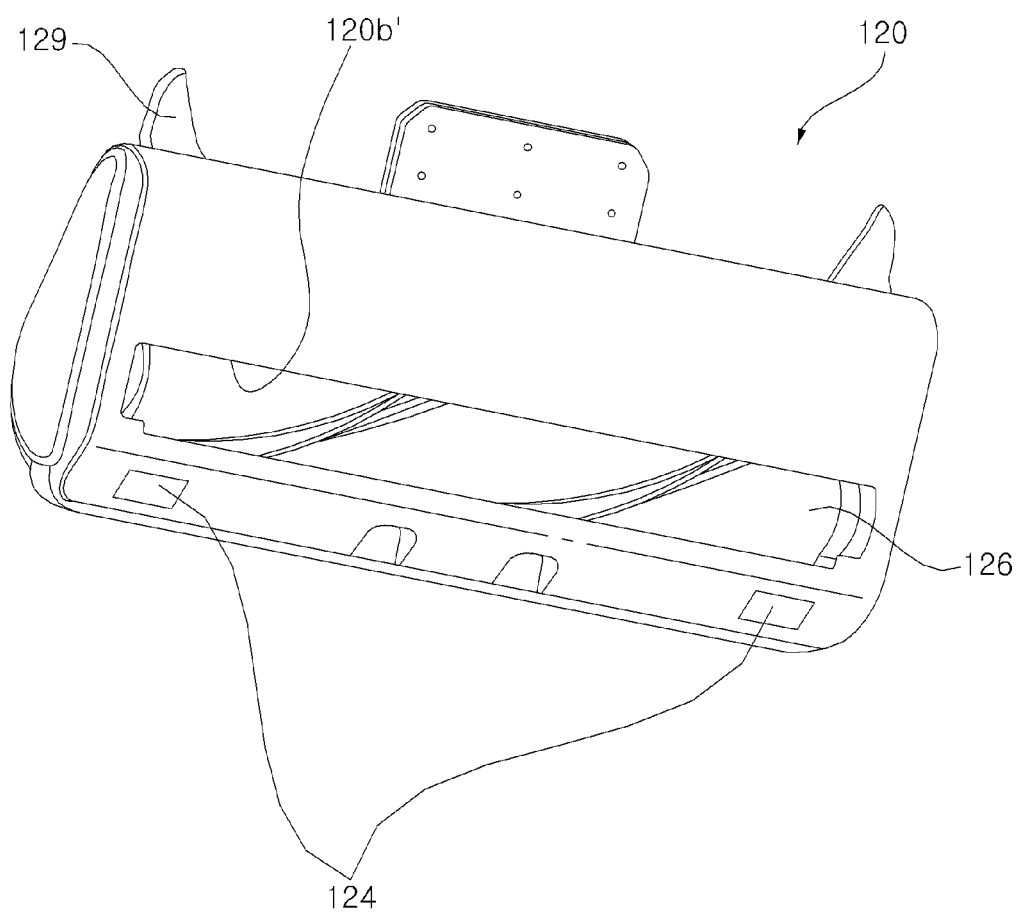
FIG. 5 is a view showing the bottom of the cleaning unit shown in FIG. 1.

FIG. 1 is a perspective view showing a robot cleaner according to an embodiment of the present invention, FIG. 2 is a plan view of the robot cleaner shown in FIG. 1, FIG. 3 is a side view of the robot cleaner shown in FIG. 1, FIG. 4 is a side view of a cleaning unit shown in FIG. 1, and FIG. 5 is a view showing the bottom of the cleaning unit shown in FIG. 1.

Referring to the drawings, a robot cleaner 100 is capable of traveling a predetermined region on its own. The robot cleaner 100 is capable of performing a function of cleaning a floor. In this case, cleaning the floor may include suctioning foreign substances (for example, dust) or mobbing the floor.

The robot cleaner 100 may include a main body 110. The main body may include a cabinet that defines an exterior appearance. The robot cleaner 100 may include a cleaning unit 120 and a dust container 140, which are provided in the main body 110. The robot cleaner 100 may include a sensing unit 130 that senses information on an environment around the robot cleaner 100. The robot cleaner 100 may include a driving unit 150 (see FIG. 6) that moves the main body 110. The robot cleaner 100 may include a controller 181 (see FIG. 6) for controlling the robot cleaner 100. The controller 181 may be provided in the main body 110.

The driving unit 150 may include a wheel unit 151 for traveling of the robot cleaner 100. The wheel unit 151 may be provided in the main body 110. By the wheel unit 151, the robot cleaner 100 may move in a forward, backward, leftward, or rightward direction or rotate. As the controller 181 controls driving of the wheel unit 151, the robot cleaner 100 is allowed to autonomously travel over a floor. The wheel unit 151 may include a main wheel 151$a$ and a sub wheel 151$b$.

The main wheel 151$a$ may be provided as two main wheels on both sides of the main body 110, and configured to rotate in one direction or the other direction in accordance with a control signal from the controller 181. Each main wheel 151$a$ may be driven independently of each other. For example, each main wheel 151$a$ may be driven by a different motor.

The sub wheel 151$b$ supports the main body 110 together with the main wheels 151$a$, and assists traveling of the robot cleaner 100 by the main wheels 151$a$. The sub wheel may be also provided even in the cleaning unit 120 which will be described later.

The cleaner 120 may be disposed to protrude from the front F of the main body 110. The cleaning unit 120 may be formed to protrude from the front of the main body 110 toward the left and right sides. A front end of the cleaning unit 120 may be disposed at a location spaced apart forward from one side of the main body 110. The left and right ends of the cleaning unit 120 may be disposed at locations spaced apart from leftward and rightward, respectively, from the main body 110.

The cleaning unit 120 may be positioned at the front of the main body 110 and perform cleaning. The cleaning unit 120 may be detachably coupled to the main body 110. The cleaning unit 120 may be a concept including a suction unit 120 and a mop module.

Meanwhile, although the cleaning unit 120 is depicted as the suction unit 120 in FIGS. 1 to 5, the cleaning unit 120 may be embodied such that, when the suction unit 120 is detached from the main body 110, the mop module (not shown) may replace the detached suction unit 120 to be detachably coupled to the main body 110. Hereinafter, for convenience of explanation, the cleaning unit 120 is described as the suction unit 120, but it may be understood that the cleaning unit 120 includes the suction unit 120 and the mop module (not shown), as described above.

The cleaning unit 120 may include a case 121 that defines an exterior appearance of the cleaning unit 120. The case 121 may include a suction port 120b' through which dust-containing air is introduced.

According to an embodiment, the cleaner 120 may include a brush roller 126 for efficiently suctioning dust. The brush roller 126 may be rotatable relative to the suction port 120b' to make dust float so that the floated dust flows into the cleaning unit 120. To this end, the brush roller 126 may include a plurality of brushes spirally arranged on an outer circumferential surface of the brush roller 126.

According to an embodiment, a suction port 120b" (see FIG. 8B) may be disposed at the bottom of the main body 110. In this case, the suction port 120b" (see FIG. 8B) may be spaced apart a predetermined distance from the front surface of the main body 110.

An inclined part 120a upwardly inclined with respect to the floor G may be formed at the front end portion of the lower side of the cleaning unit 120, and a cliff sensor 124 may be installed at the inclined part 120a to face the floor G. According to the above-described structure, the cliff sensor 124 may be able to sense a geographic feature and an obstacle under the front lower side of the cleaning unit 120. According to an embodiment of the present invention, the cliff sensor 124 may be provided vertical to the floor G to sense a geographic feature and an obstacle immediately under the cliff sensor 124.

The cliff sensor 124 may sense an object around the main body 110. In particular, the cliff sensor 124 may sense information related to a height of an object. The cliff sensor 124 may include a light emitter and a light receiver. The cliff sensor 124 may sense information on a distance between the cliff sensor 124 and the floor G and a height of an object by measuring a time for which light emitted by the light emitter onto the floor G is received by the light receiver.

For example, as the height of an object increases, it may take longer time until the light receiver receives light. In this case, the controller 181 may calculate the height of the object based on a time taken until the light receiver receives light.

According to an embodiment of the present invention, the robot cleaner 100 may include a three-dimensional (3D) camera sensor (not shown) attached to one surface or one portion of the main body 110 to generate 3D coordinate information related to surroundings of the main body 110. The robot cleaner 100 may sense a height of an obstacle based on field data generated by the 3D camera sensor (not shown).

Meanwhile, if a height of an obstacle sensed by the cliff sensor 124 and/or the 3D camera sensor (not shown) is equal to or lower than a predetermined height, the controller 181 may control each configuration of the robot cleaner 100 so that the robot cleaner 100 intensively cleans a boundary surface of an obstacle. Detailed description thereof will be provided with reference to FIG. 7 and subsequent drawings.

Meanwhile, the main body 110 may be formed in a circular shape. As both sides of the rear end of the cleaning unit 120 protrude to the left and the right from the main body 110, an empty space may be formed between the main body 110 and the cleaning unit 120. The empty space is a space between the left and right ends of the main body 110 and the left and right ends of the cleaning unit 120, and the empty space may be formed in a shape recessed inward of the robot cleaner 100.

If an obstacle is fitted into the empty space, the robot cleaner 100 may be restrained by the obstacle and unable to move. To avoid this, a cover member 129 may be disposed to cover at least part of the empty space.

The sensing unit 130 (see FIG. 6) may sense an obstacle or a geographic feature around the robot cleaner 100. The sensing unit 130 may include at least one of an external signal sensor, an obstacle sensor, the cliff sensor 124, a lower camera sensor, an upper camera sensor, a 3D camera sensor, an encoder, an impact sensor, or a microphone.

These sensors may be disposed at the front F of the main body 110 and the front lower side of the cleaning unit 120.

A dust container accommodation part may be provided in the main body 110. A dust container 140, which separates and collects dust from suctioned air, may be detachably coupled to the dust container accommodation part. The dust container accommodation part may be formed at the rear R of the main body 110. A portion of the dust container 140 may be formed as the dust container accommodation part, and the other portion of the dust container 140 may be formed to protrude toward the rear R of the main body 110.

An entrance (not shown), through which dust-contained air is introduced, and an exit (not shown), through which air having dust separated therefrom is discharged, may be formed in the dust container 140. When the dust container 140 is mounted in the dust container accommodation part, the entrance and the exit of the dust container 140 may be configured to respectively communicate with a first opening (not shown) and a second opening (not shown) which are formed on an inner side wall of the dust container accommodation part.

Meanwhile, the robot cleaner 100 may include an intake flow path (not shown) through which air is guided from the suction port 120b' of the cleaning unit 120 to the first opening (not shown). In addition, the robot cleaner 100 may include an exhaust flow path (not shown) through which air is guided from the second opening toward an exhaust port (not shown).

Air containing dust, which is introduced through the cleaning unit 120, may be introduced into the dust container 140 via the intake flow path in the main body 110, and the dust is separated from the air by passing through at least one cyclone provided in the dust container 140. In addition, the dust may be collected in the dust container 140, and the air may be discharged from the dust container 140. The discharged air may be discharged to the outside through the exhaust port by passing through the exhaust flow path in the main body 110.

Figure 6:
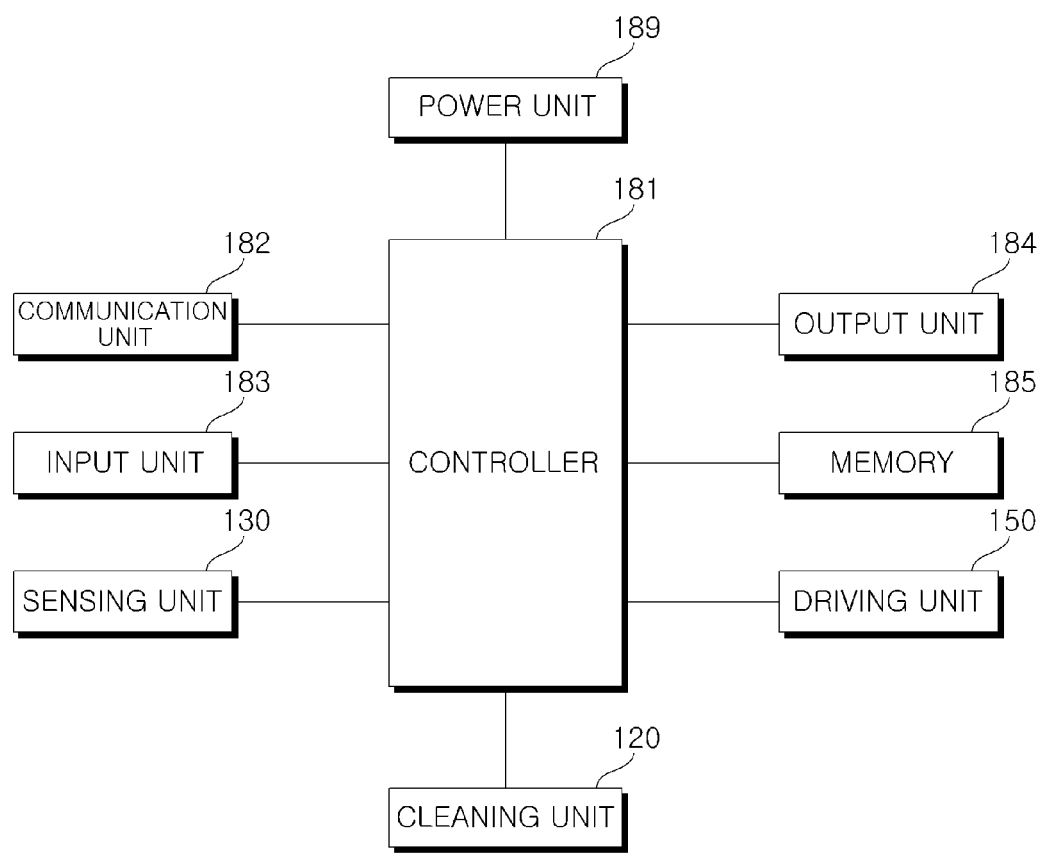
FIG. 6 is a control block diagram of the robot cleaner shown in FIG. 1.

FIG. 6 is a control block diagram of the robot cleaner shown in FIG. 1.

Referring to the drawing, the robot cleaner 100 may include a power unit 189 configured to supply power, a communication unit 182 configured to perform communication via a predetermined network, an input unit 183 configured to receive various commands from a user, and an output unit 184 configured to output various kinds of information.

In addition, the robot cleaner 100 may include: a driving unit 150 configured to move the main body 110; the cleaning unit 120 disposed at the front of the main body 110 and configured to perform cleaning; the sensing unit 130 configured to sense an obstacle around the main body 110; a memory 185 configured to store a variety of data; and the controller 181 configured to control overall operations of the robot cleaner 100.

The power unit 189 may supply driving power to each configuration included in the robot cleaner 100. The power unit 189 may supply operation power required for the robot cleaner 100 to travel or perform a particular function.

The power unit 189 may include a battery (not shown) mounted in the main body 110. The battery (not shown) may be rechargeable. The battery may be recharged by an external commercial power source. The battery may be provided attachable to and detachable from a bottom surface of the main body 110.

Meanwhile, the controller 181 may sense a remaining battery capacity, and, if the remaining battery capacity is not sufficient, the controller 181 may control the robot cleaner 100 to move to a charging station connected to the external commercial power source. The output unit 184 may display a remaining battery capacity under control of the controller 181.

The communication unit 182 may be connected with a terminal and/or a different device located in a particular region via one communication method from among a wired communication method, a wireless communication method, and a satellite communication method, thereby enabled to transmit and exchange signals and data with respect to the terminal and/or the different device. In addition, the communication unit 182 may be connected with a server (not shown) and/or an access point (AP) in a predetermined communication method, thereby enabled to exchange data with the server and/or the AP. To this end, the communication unit 182 may include at least one communication module.

The communication unit 182 may transmit information, acquired from the input unit 183, via a network. The communication unit 182 may transmit information (for example, field data), acquired from the sensing unit 130, via a network. The communication unit 182 may transmit information on the current operation state of the robot cleaner 100 via a network. The communication unit 182 may transmit obstacle information, and a cleaning map of an area to be cleaned via a network.

In this case, the network may be established based on a technology such as Wi-Fi, Ethernet, Zigbee, Z-wave, Bluetooth, and the like.

The input unit 183 may receive various control commands regarding the robot cleaner 100 from a user. The input unit 183 may include a button, a dial, a touch screen, and the like. The input unit 183 may include a microphone to receive a voice command from the user.

The output unit 184 may visually or audibly output information related to the robot cleaner 100. The output unit 184 may include a display module. For example, the output unit 184 may display a battery state, a travel type, or the like on a display. The output unit 184 may include a speaker, a buzzer, or the like, which outputs sound or a voice.

The driving unit 150 may include a motor (not shown) and drive the motor to rotate the left and right main wheels 151*a* in both directions, thereby rotating or moving the main body 110. The driving unit 150 may enable the main body 110 to travel forward, backward, leftward, or rightward, travel in a curved manner, or rotate in place.

The cleaning unit 120 may be disposed in the main body 110 to perform cleaning. The cleaning unit 120 may be detachably provided in the main body 110. The cleaning unit 120 may include a sensor at the front thereof to sense an obstacle. For example, the cleaner 120 may include the cliff sensor 124 at the front end thereof to presence a location, coordinates, a height, and the like of an obstacle.

The sensing unit 130 may sense information related to an environment where the main body 110 is located, while the robot cleaner 100 travels. The sensing unit 130 may sense information related to the environment so as to generate field data.

The sensing unit 130 may sense location information of an obstacle, height information of the obstacle, exterior appearance information of the obstacle, geographic feature information of a region to be cleaned, etc. To this end, the sensing unit 130 may include at least one of an external signal sensor, an obstacle sensor, a cliff sensor, a lower camera sensor, an upper camera sensor, a 3D camera sensor, an encoder, an impact sensor, or a microphone.

The external signal sensor may sense a signal external to the robot cleaner 100. The external signal sensor may be, for example, an infrared ray (IR) sensor, an ultrasonic sensor, a radio frequency (RF) sensor, and the like. Accordingly, field data on the external signal may be generated. The robot cleaner 100 may receive a guidance signal, generated by a charging station, using the external signal sensor, and, based on the received guidance signal, sense information on a location of the charging station and a direction in which the charging station is located. In this case, the charging station may transmit the guidance signal indicative of the direction and the distance, so that the robot cleaner 100 is enabled to return to the charging station. That is, the robot cleaner 100 may determine the current location thereof by receiving a signal transmitted from the charging station, and may return to the charging station by setting a moving direction.

The obstacle sensor may be installed at the front of the robot cleaner 100. The obstacle sensor may sense an obstacle located in front of the robot cleaner 100. Accordingly, field data on the obstacle may be generated.

The obstacle sensor may transmit field data, which is generated as a result of sensing of an obstacle present in a moving direction of the robot cleaner 100, to the controller 181. That is, the obstacle sensor may sense a protrusion, furnishings, furniture, a wall surface, a wall corner, etc. which are present in a movement path of the robot cleaner 100 in a house, and the obstacle sensor may transmit corresponding information to the controller 181.

The obstacle sensor may be, for example, an IR sensor, a ultrasonic sensor, an RF sensor, an electromagnet sensor, etc. The robot cleaner 100 may use one obstacle sensor or, if necessary, two or more obstacle sensors at the same time.

The cliff sensor may generally use various shapes of optical sensor to sense an obstacle present on the floor that supports the main body 110 of the robot cleaner 100. Accordingly, field data on the obstacle present on the floor may be generated.

The cliff sensor may be installed on the rear surface of the cleaning unit 120. The cliff sensor may sense an obstacle present on a floor. The cliff sensor may be an IR sensor, an ultrasonic sensor, an RF sensor, a position sensitive detector (PSD) sensor, etc., each of which includes a light emitter and a light receiver as does the obstacle sensor.

For example, the cliff sensor may be a PSD sensor or a plurality of different sensors. The PSD sensor may include a light emitter for emitting an infrared light to an obstacle, and a light receiver for receiving an infrared light returned after being reflected from the obstacle. The PSD sensor may be formed as a module. If an obstacle is sensed using the PSD sensor, a stable measurement may be obtained regardless of difference in reflectivity or color of the obstacle.

The controller 181 may measure an angle between an infrared light emitting signal irradiated by the cliff sensor toward the ground and a reflection signal received after being reflected from the obstacle, and a time taken to receive the reflection signal. In doing so, the controller 181 may sense a height of the obstacle and acquire field data on the obstacle.

The lower camera sensor may be provided on the rear surface of the robot cleaner 100. The lower camera sensor may acquire image information (field data) on a surface to be cleaned during movement. The lower camera sensor is also referred to as an optical flow sensor in other words. The lower camera sensor may convert an image of a lower side, input from an image sensor provided in the lower camera sensor, to generate image data of a predetermined format. Field data on the image recognized using the lower side camera may be generated.

Using the lower camera sensor, the controller 181 may detect a location of the robot cleaner 100 regardless of whether the robot cleaner 100 slides. The controller 180 may compare and analyze data on images, captured by the lower camera sensor over time, to calculate a distance travelled and a direction of travel. The controller 181 may calculate a location of the robot cleaner 100 on the basis of the calculated distance and the calculated direction.

The upper camera sensor may be installed to face upwards or forwards to capture images around the robot cleaner 100. In a case where the robot cleaner 100 includes a plurality of upper camera sensors, the camera sensors may be formed on an upper surface or a side surface of the robot cleaner 100 at a predetermined distance or at a predetermined angle. Field data on an image recognized by the upper camera sensor may be generated.

The 3D camera sensor may be attached to one surface or a portion of the main body 110 of the robot cleaner 100 to generate 3D coordinate information related to surroundings of the main body 110. That is, the 3D camera sensor may be a 3D depth camera that calculates a distance between the robot cleaner 100 and a subject. Accordingly, field data on the 3D coordinate information may be generated.

Specifically, the 3D camera sensor may capture a two-dimensional (2D) image related to surroundings of the main body 110, and generate a plurality of 3D coordinate information corresponding to the captured 2D image.

In one embodiment, the 3D camera sensor may include two or more existing cameras each configured to acquire a 2D image, and the 3D camera sensor may be based on stereo vision in such a way to generate 3D coordinate information by combining two or more images acquired by the two or more cameras.

Specifically, the 3D camera sensor according to the above embodiment may include: a first pattern emission unit for emitting light of a first pattern toward a front lower side of the main body 110; a second pattern emission unit for emitting light of a second pattern toward a front upper side of the main body 110; and an image acquisition part for acquiring an area in front of the main body 110. In doing so, the image acquisition unit may acquire an image of an area in which the light of the first pattern and the light of the second pattern are incident.

In another embodiment, the 3D camera sensor may include an IR pattern emitter for emitting an IR pattern, together with a single camera, and capture a distance between the 3D camera sensor and a subject by capturing a shape of an IR pattern irradiated by an IR pattern emitter onto the subject. In this case, the 3D camera sensor may be an Infra Red (IR)-based 3D camera sensor.

In yet another embodiment, the 3D camera sensor may include a light emitter for emitting light in addition to a single camera, and measure a distance between the 3D camera sensor and a subject by receiving laser beams reflected from the subject among laser beams emitted from the light emitter and analyzing the received laser beams. This type of 3D camera sensor may be a Time of Flight (TOF)-based 3D camera sensor.

Specifically, a laser included in the above 3D camera sensor may be configured to emit a laser beam that extends at least in one direction. In one example, the 3D camera sensor may include a first laser and a second laser, and the first laser may emit laser beams that cross each other, and the second laser may emit a single straight laser beam. Accordingly, a lowest laser may be used to sense an obstacle on a floor, a highest laser may be used to sense an obstacle above, and a middle laser positioned between the lowest laser and the highest laser may be used to sense an obstacle positioned in a middle space.

Meanwhile, the controller 181 may sense an object around the main body 110 or calculate height information of the object based on field data that is generated by one of the obstacle sensor, the cliff sensor, the lower camera sensor, the upper camera sensor, and the 3D camera sensor or a combination thereof.

In addition, the controller 181 may calculate location information of an obstacle based on field data that is generated by one of the obstacle sensor, the cliff sensor, the lower camera sensor, the upper camera sensor, and the 3D camera sensor or a combination thereof. The controller 181 may write a cleaning map of an area to be cleaned based on the location information of the obstacle. At this point, the controller 181 may store the cleaning map in the memory 185.

The encoder may sense information related to operation of a motor that drives wheels of the driving unit 150. Accordingly, field data on the operation of the motor may be generated.

The impact sensor may sense impact of a collision of the robot cleaner 100 with an external obstacle. Accordingly, field data on the external impact may be generated.

The microphone may sense external sound. Accordingly, field data on the external sound may be generated.

The sensing unit 130 may further include an image sensor. Meanwhile, the controller 181 may extract information on an outline of an obstacle based on field data that is generated by one of the obstacle sensor, the cliff sensor, the lower camera sensor, the upper camera sensor, and the 3D camera sensor or a combination thereof, and the sensing unit 130 may control the main body 110 to follow an outline of the obstacle.

The sensing unit 130 may further include a gyro sensor. When the robot cleaner 100 moves in accordance with an operation mode, the gyro sensor may detect a direction of rotation and an angle of rotation. The gyro sensor may detect an angular velocity of the robot cleaner 100 and output a voltage value proportional to the angular velocity. Using the voltage value output from the gyro sensor, the direction and angle of rotation of the main body 110 may be calculated.

The memory 185 may store a control program controlling or driving the robot cleaner 100, and data corresponding thereto. The memory 185 may store audio information, image information, and location information of the robot cleaner 100. The memory 185 may store information related to a traveling pattern of the robot cleaner 100.

In addition, the memory 185 may store location information of an obstacle, contour information of the obstacle, cleaning map information on an area to be cleaned.

The memory 185 may store information received from the communication unit 182 via a network. The memory 185 may store a user command from the input unit 183.

The memory 185 may store information (e.g., field data) acquired from the sensing unit 130. The memory 185 may temporarily store the field data and delete the stored field data under a predetermined condition.

The memory 185 may include a non-volatile memory (NVM)(or NVRAM). Here, the NVM is a storage device capable of continuously maintaining stored information even though power is not applied thereto. For example, the memory 185 may be a ROM, a flash memory, a magnetic computer storage device (e.g., a hard disk, a diskette drive, and a magnetic tape), an optical disk drive, a magnetic RAM, a PRAM, and the like.

The controller 181 may control overall operations of the robot cleaner 100.

The controller 181 may drive the driving unit 150 to move the main body 110. The controller 181 may control the driving unit 150 to rotate the main wheels 151a at a constant speed, thereby causing the main body 110 straight forward. The controller 181 may differentiate rotation speeds of the main wheels 151a to rotate the main body 110 by a desired angle, thereby changing a direction of travel. That is, the robot cleaner 100 may clean a target area by rotating the main body 110, or, in other words, by changing an angle of rotation of the main body 110 freely, so that the robot cleaner 100 is able to clean the target area while traveling in a curved manner.

The controller 181 may control the driving unit 150 to control the rotation speeds of the main wheels 151a. For example, when the main body 110 approaches an obstacle, the controller 181 may control the driving unit 150 to decrease the rotation speeds of the main wheels 151a linearly. In another example, when the main body 110 moves away from an obstacle, the controller 181 may control the driving unit 150 to increase the rotation speeds of the main wheels 151a linearly.

In the case where the cleaner 120 is configured as the suction unit 120, the controller 181 may control a motor or the like to control a suction force of the suction unit 120. For example, when the main body 110 approaches an obstacle, the controller 181 may control a motor or the like to increase the suction force of the suction unit 120. In another example, when the main body 110 moves away from an obstacle, the controller 181 may control a motor or the like to decrease the suction force of the suction unit 120.

In the case where the cleaning unit 120 is configured as a mop module, the controller 181 may control a motor or the like to control a rotational speed of a spin mop. For example, when the main body 110 approaches an obstacle, the controller 181 may control a motor or the like to increase the rotational speed of the spin mop linearly. In another example, when the main body 110 moves away from an obstacle, the controller 181 may control a motor or the like to decrease the rotational speed of the spin mop linearly.

In the case where the sensing unit 130 senses an obstacle whose height is equal to or lower than a predetermined height, the controller 181 may control each element of the robot cleaner 100 so that the cleaning unit 120 intensively cleans a boundary of the obstacle.

The controller 181 may write a cleaning map based on location information of the obstacle, which is sensed during the intensive cleaning of the boundary of the obstacle.

Figure 7:
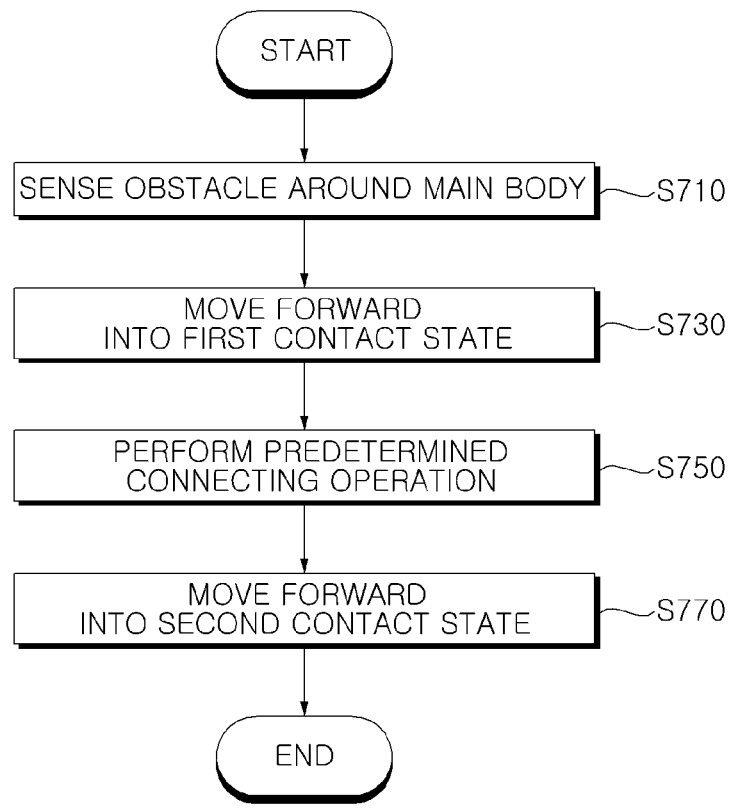
FIG. 7 is a flowchart illustrating a method for controlling a robot cleaner according to an embodiment of the present invention.
Figure 8A:
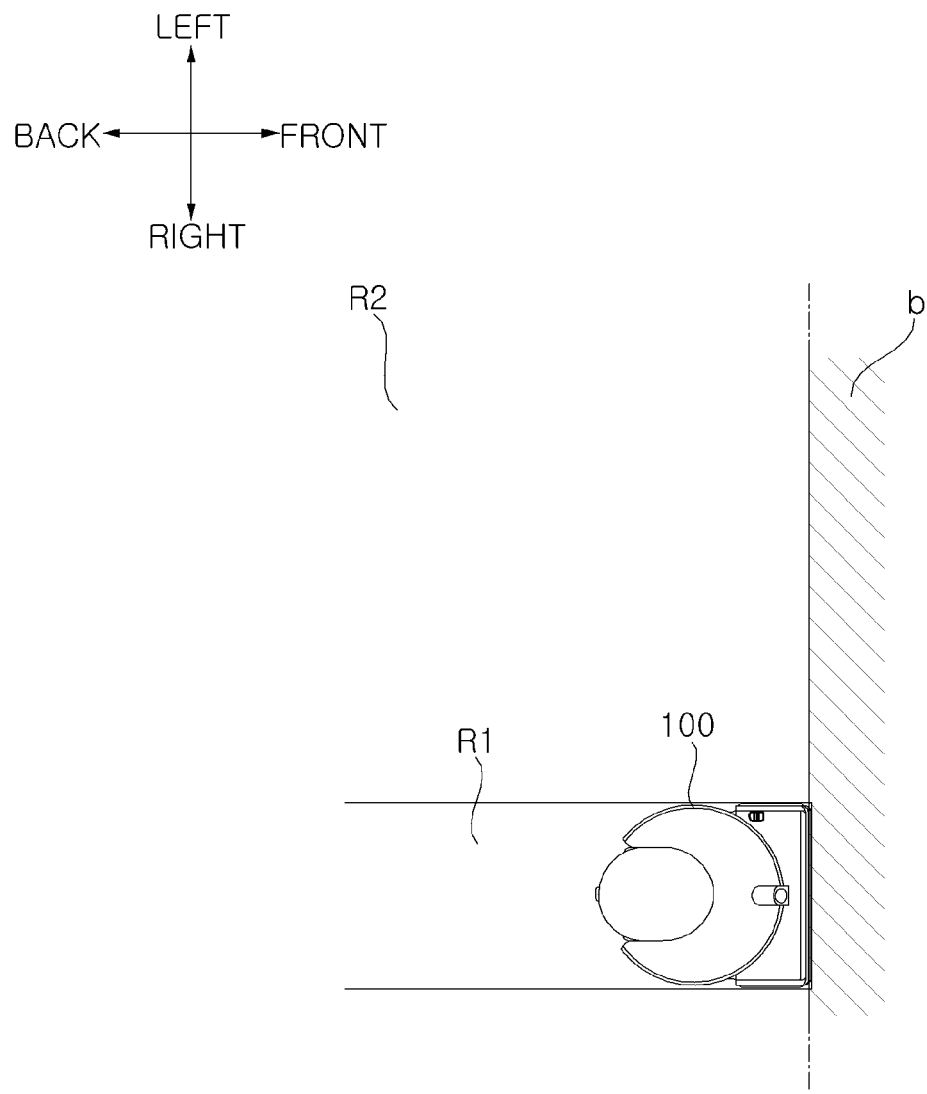
FIGS. 8A and 8B are diagrams for explanation of a first contact state described in FIG. 7.
Figure 8B:
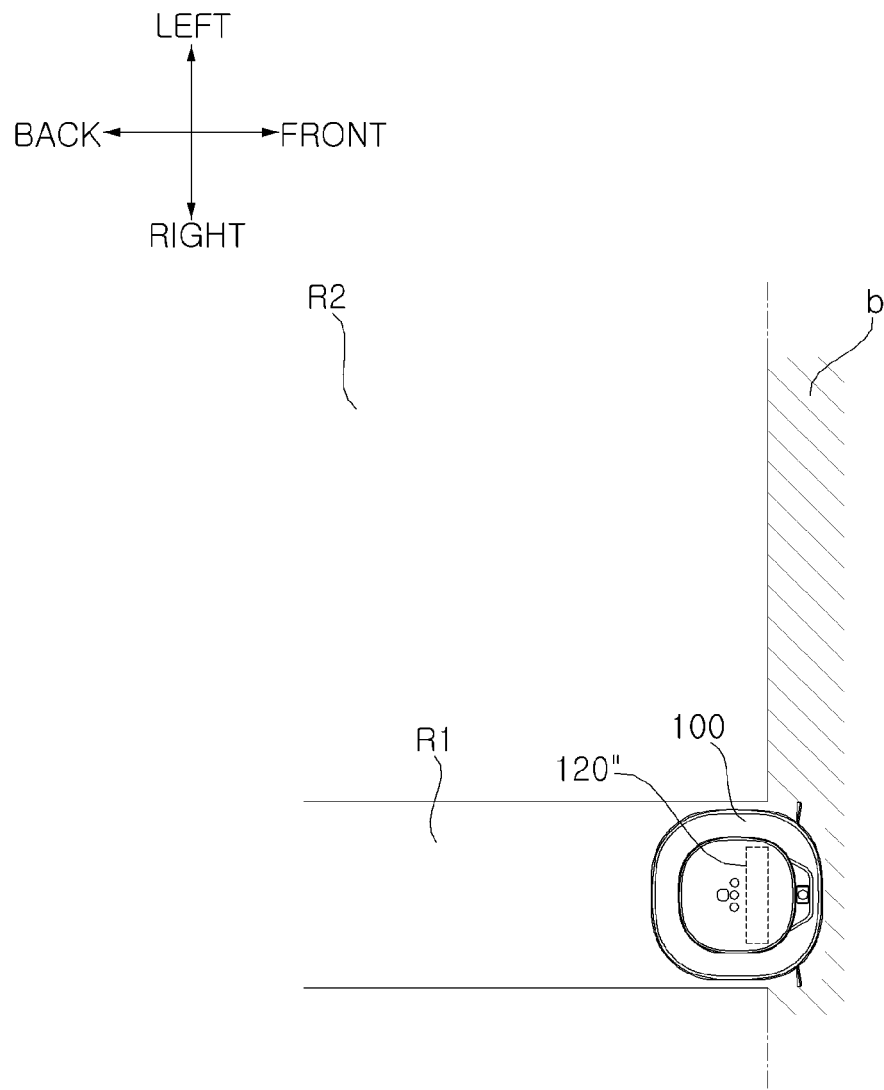

FIG. 7 is a flowchart illustrating a method for controlling a robot cleaner according to an embodiment of the present invention, FIGS. 8A and 8B are diagrams for explanation of a first contact state described in FIG. 7, and FIGS. 9A-9E and 10A-10F are diagrams for explanation of a connecting operation described in FIG. 7.

Referring to the drawings, the sensing unit 130 may sense an obstacle b around the main body 110 (S711). The sensing unit 130 may sense location information and height information of the obstacle b around the main body 110.

In the case where the sensing unit 130 senses the obstacle b, the controller 181 may control the driving unit 150 to move the main body 110 forward so that the main body 110 is brought into a first contact state in which some elements of the robot cleaner 100 clean a first region 810 while in contact with the obstacle b (S730).

According to a first embodiment of the present invention, as shown in FIG. 8A, in the case where the sensing unit 130 senses the obstacle b, the controller 181 may control the driving unit 150 to move the main body 110 forward so that the main body 110 is brought into a first contact state in which the front end of the cleaning unit 120 cleans the first region 810 while in contact with the obstacle b (S730).

According to a second embodiment of the present invention, as shown in FIG. 8B, in the case where the sensing unit 130 senses the obstacle b, the controller 181 may control the driving unit 150 to move the main body 110 forward so that the main body 110 is brought into a first contact state in which the front end of the suction port 120b" of the robot cleaner 100 cleans the first region 810 while in contact with the obstacle b (S730).

In the case where the front end of the suction port 120b" of the robot cleaner 100 is in contact with the obstacle b, a portion of the main body 110 may move over the obstacle b depending on a location of the suction port 120b". In addition, a main wheel and/or an auxiliary wheel may move over the obstacle b.

Meanwhile, the front end of the cleaning unit 120 of the robot cleaner 100 or the front end of the suction port 120b" of the robot cleaner 100 is allowed to come into contact with the obstacle b, as shown in the above-described first and second embodiments. Accordingly, in this case, a suction force is increased compared to the case where a side surface of the robot cleaner 100 is in contact with the obstacle b. As a result, a more amount of foreign substances may be collected and the foreign substances may be removed more effectively.

Meanwhile, there is no difference between the examples of the robot cleaner 100 shown in FIGS. 8A and 8B except the fact that the front end of the cleaning unit 120 is in contact with the obstacle b in the example of FIG. 8A while the front end of the suction port 120b" is in contact with the obstacle in the example of FIG. 8B. That is, in either case, the robot cleaner 100 may perform a predetermined connecting operation shown in FIGS. 9A-9E and 10A-10F.

In FIGS. 9A-9E and subsequent drawings, it is illustrated that the front end of the cleaning unit 120 is in contact with the obstacle b for convenience of explanation, but a predetermined connecting operation may be performed with the front end of the suction port 120*b*" being in contact with the obstacle. Thus, the front end of the cleaning unit 120 and the front end of the suction port 120*bb*" may be used interchangeably in the following description.

Figure 9A:
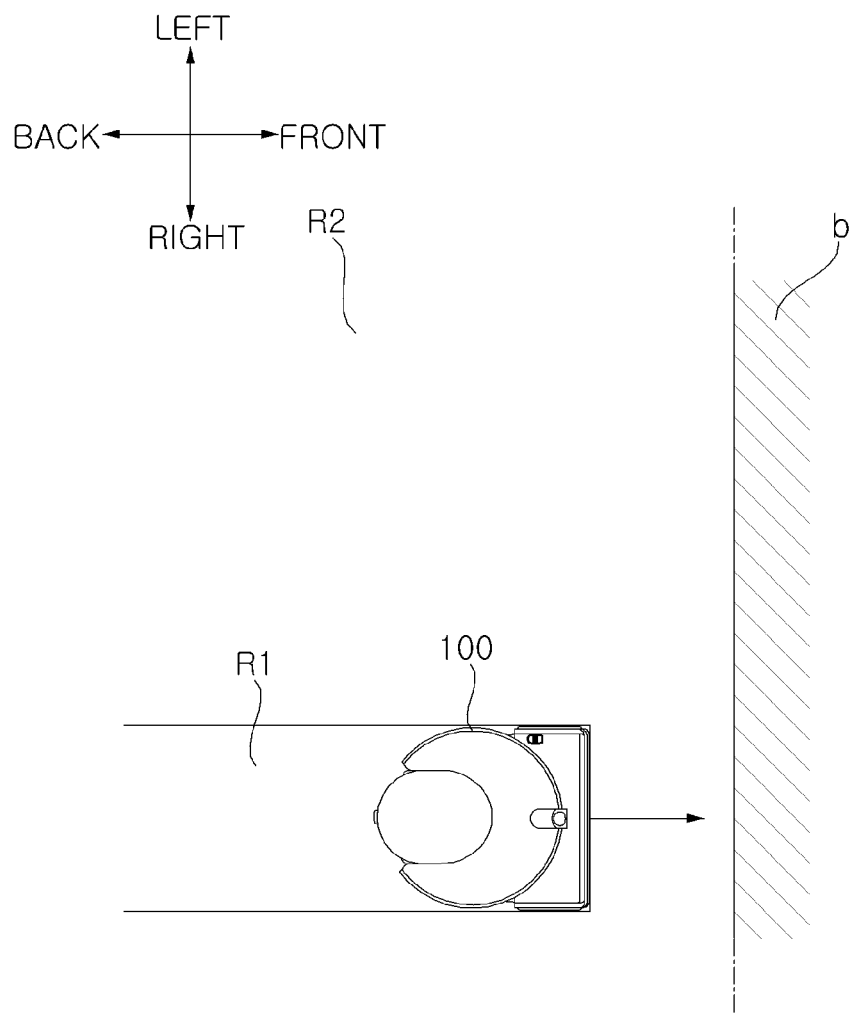
Figure 10A:
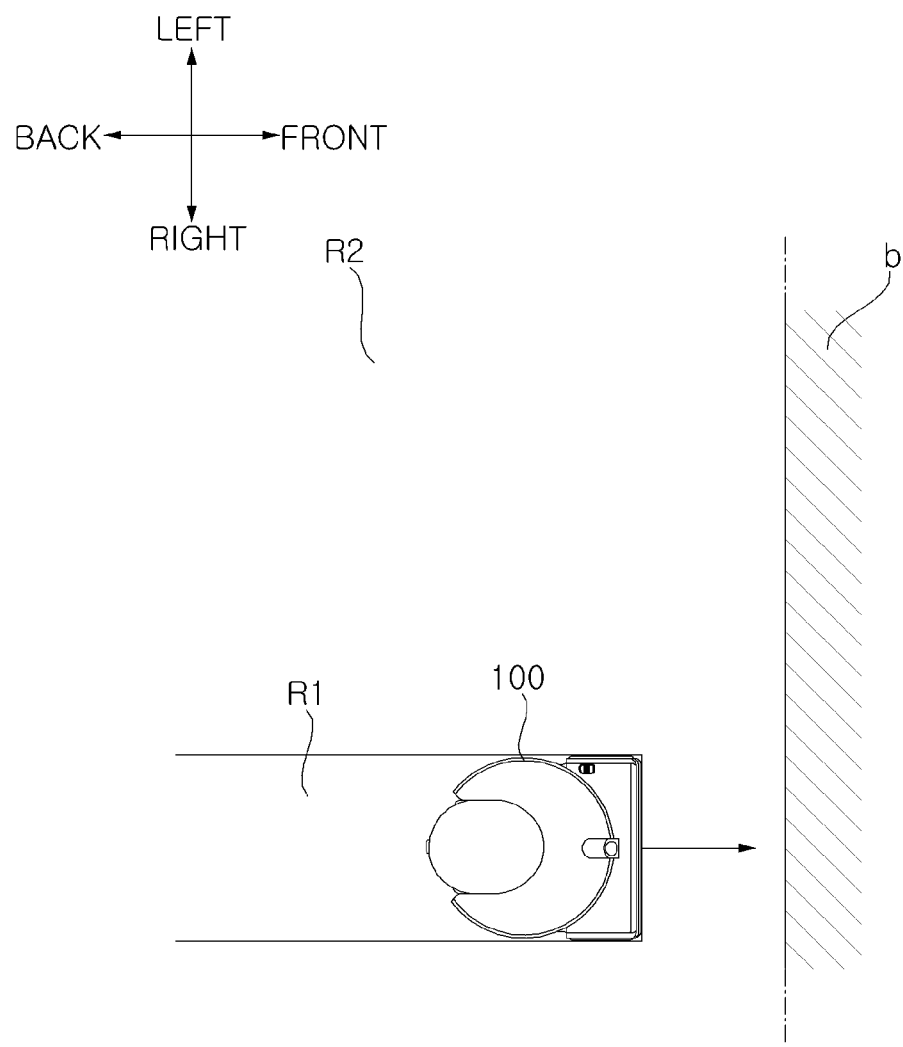
FIGS. 10A-10F are diagrams for explanation of a connecting operation shown in FIG. 7.

Again, in the step S730, as shown in FIGS. 9A and 10A, in the case where the sensing unit 130 senses the obstacle b, the controller 181 may control the driving unit 150 so that the main body 110 approaches the obstacle b. As the main body 110 moves forward toward the obstacle b, a cleaned region R1 and a non-cleaned region R2 may be classified.

Figure 9B:
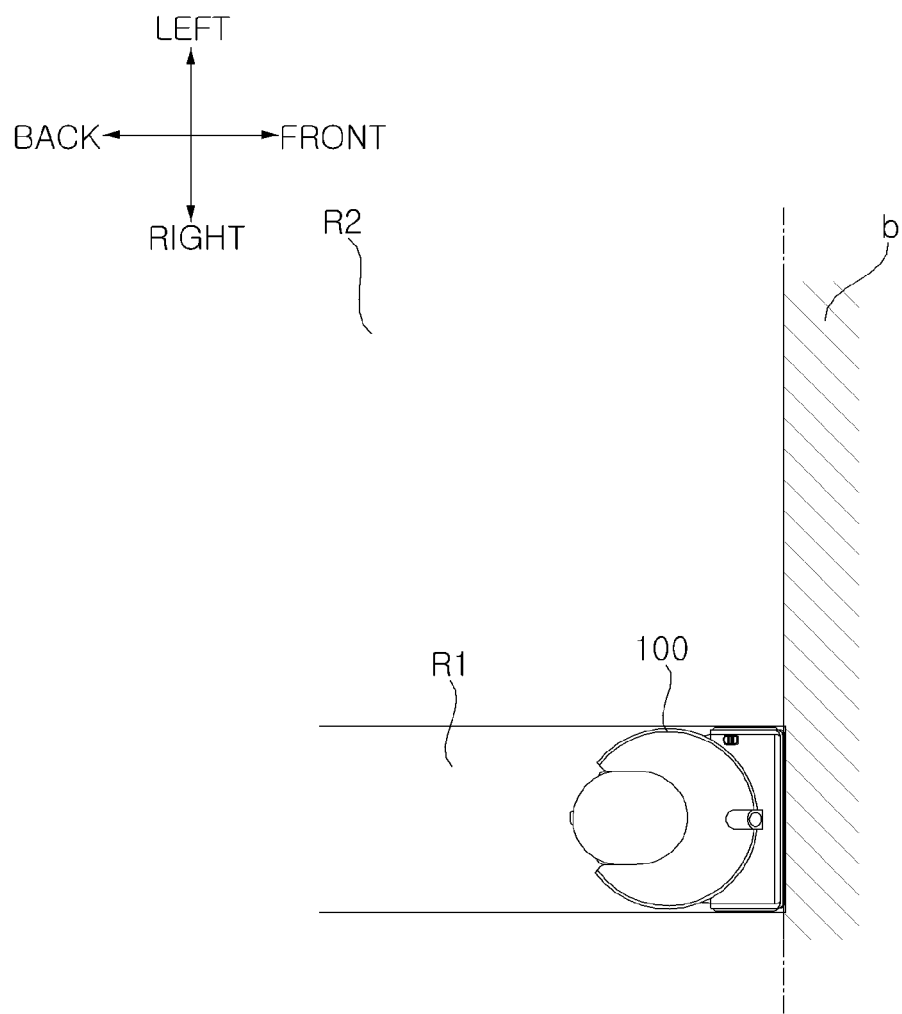
Figure 10B:
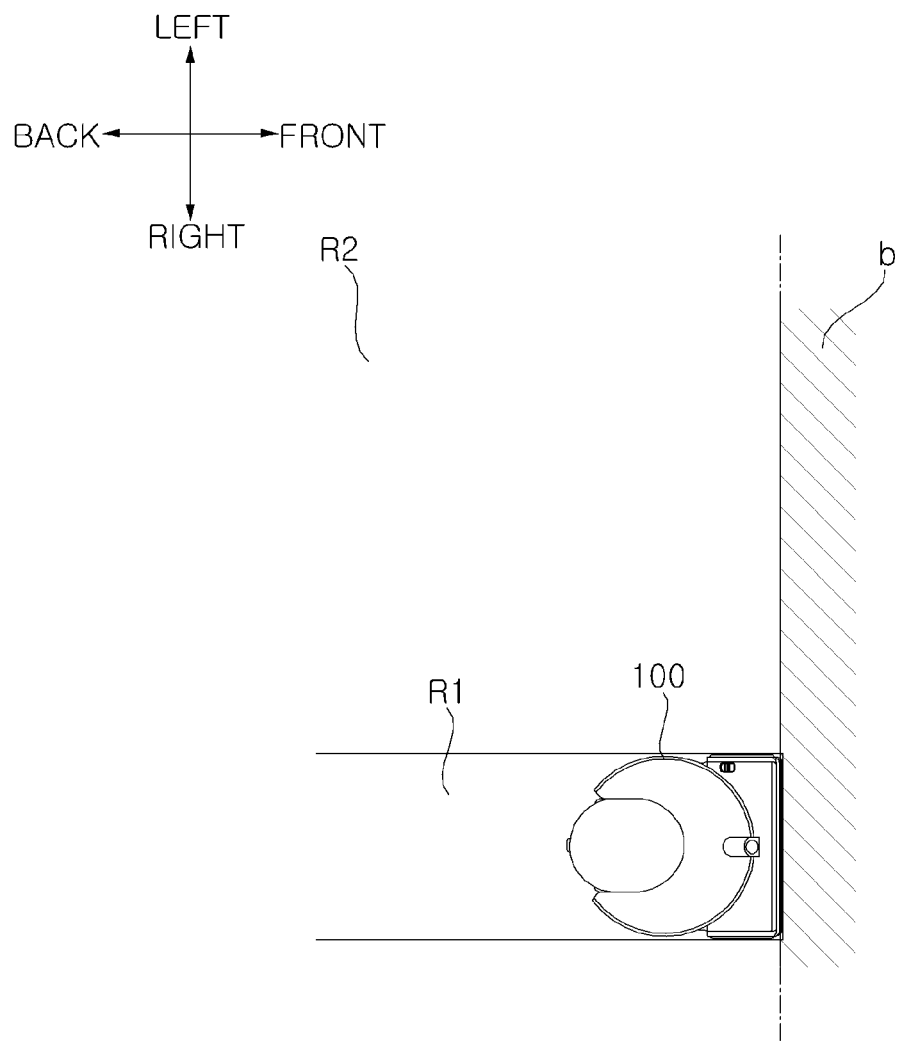

In addition, as shown in FIGS. 9B and 10B, the robot cleaner 100 may be brought into a first contact state in which the cleaning unit 120 cleans the first region 810 while in contact with the obstacle b. Alternatively, the robot cleaner 100 may be brought into a first contact state in which the suction port 120*b*" cleans the first region while in contact with the obstacle b.

After the first contact state, the controller 181 may perform a predetermined connecting operation to move the main body 110 backward so that the main body 110 is brought into a second contact state in which the front end of the cleaning unit 120 cleans a second region 830 while in contact with the obstacle b (S750, S770).

Alternatively, after the first contact state, the controller 181 may move the main body 110 according to a predetermined connecting operation so that the main body 110 is brought into a second contact state in which the front end of the suction port 120*b*" of the robot cleaner 100 cleans the second region 830 while in contact with the obstacle b (S750, S770).

The connecting operation may include moving the main body 110 backward to move the front end of the cleaning unit 120 away from the obstacle b, and then moving the main body 110 forward to bring the front end of the cleaning unit 120 into contact with the obstacle b.

FIGS. 9C to 9E and 10C to 10F are diagrams for explanation of the connecting operation.

Figure 9C:
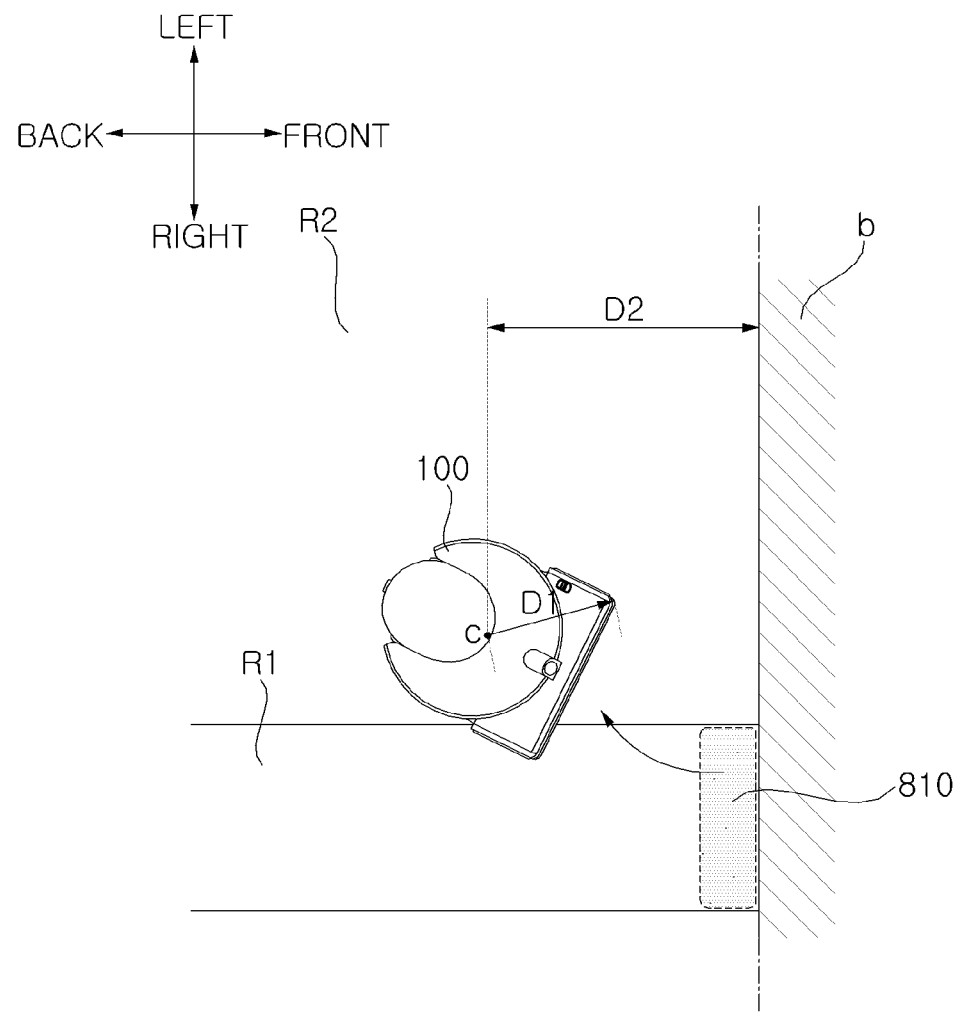
Figure 9E:
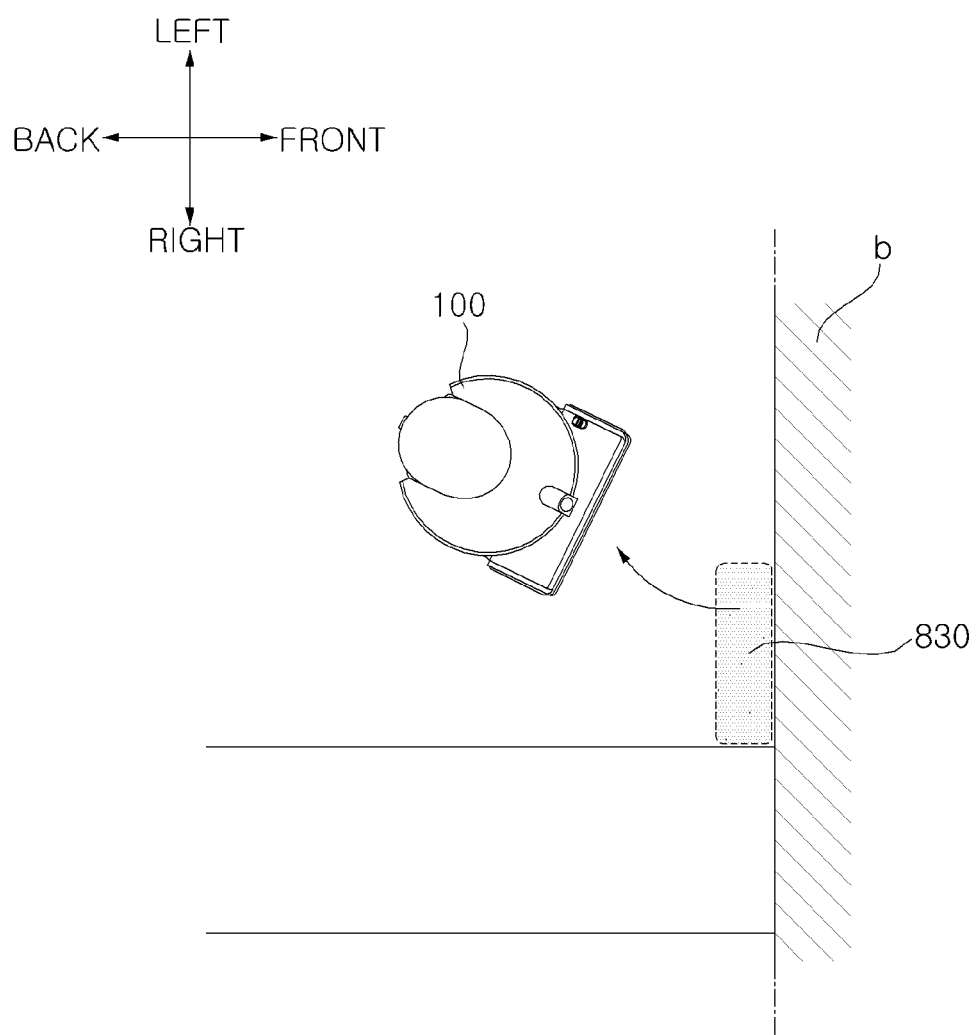

According to an embodiment of the present invention, in FIGS. 9C to 9E, when moving the main body 110 backward, the controller 181 may control the driving unit 150 to move the main body 110 backward in a direction in which the non-cleaned region R2 is present. When moving the main body forward, the controller 181 may control the driving unit 150 to move the main body 110 forward so that the main body 110 is brought into a second contact state in which the front end of the cleaning unit 120 is in contact with the obstacle b again.

More specifically, the controller 181 may calculate a movement path of the robot cleaner 100 using the sensing unit 130, and classify an indoor space into the cleaned region R1 and the non-cleaned region R2 based on the movement path.

In FIG. 9C, after the first contact state, the controller 181 may control the driving unit 150 so that the main body 110 moves backward in a direction in which the non-cleaned region R2 is present. FIG. 9C illustrates that the main body 110 moves backward in a left direction in which the non-cleaned region R2 is present. In the backward movement, a trajectory may be not just in a straight form, but also in a spiral, semi-circular, parabolic, or any other form.

When moving the main body 110 backward along a curved trajectory, the controller 181 may move the main body 110 along the rotational trajectory with maintaining a center of rotation of the main body 110 and a radius of rotation of the main body 110, or move the main body 110 with varying both the center of rotation of the main body 110 and the radius of rotation of the main body 110. In addition, the controller 181 may move the main body 110 along the rotational trajectory with varying only the radius of rotation of the main body 110 while maintaining the center of rotation of the main body 110.

The controller 181 may calculate the center of rotation and the radius of rotation by taking into account whether or not the first region 810 and the second 830 are connected or overlap each other, a width of the obstacle b, and a distance by which the main body 110 is allowed to move backward.

For example, in the case where only the radius of rotation of the main body 110 is varied while the center of rotation is maintained, if the radius of rotation becomes smaller, an area where the first region 810 and the second region 830 overlap each other may become wider.

Meanwhile, the robot cleaner 100 is capable of rotating in place, and, in this case, a center C of rotation may be located at an arbitrary point in the main body 110. In addition, when the robot cleaner 100 rotates in place, a radius of the rotation of the robot cleaner 100 may correspond to a distance D1 from the center of the rotation to the outermost point of the robot cleaner 100.

In the case where the robot cleaner 100 rotates at a point where the robot cleaner 100 stops (hereinafter, referred to as the final point of backward movement), a distance D2 between the center C of rotation of the robot cleaner 100 in place and the obstacle b should be greater than the radius D1 of rotation in order to avoid collision with the obstacle b.

Thus, the controller 181 may move the main body 110 backward toward the non-cleaned region R2, so that a distance D2 between the center C of rotation of the main body 110 in place and the obstacle b is greater than a maximum distance D1 between the center C of rotation of the main body 110 in place and the outermost line of the robot cleaner 100.

However, it is preferable that the distance D2 between the center C of rotation and the obstacle b is set to be a distance within which the sensing unit 130 is allowed to sense an object.

In FIG. 9D, the controller 181 may move the main body 110 forward so that the main body 110 is brought into a second contact state in which the front end of the cleaning unit 120 cleans the second region 830 while in contact with the obstacle b. In addition, as shown in FIG. 9E, after the second contact state, the controller 181 may repeatedly perform the above-described connecting operation by taking into account a width of the obstacle b and the like.

According to another embodiment of the present invention, in FIGS. 10C to 10F, when moving the main body 110 backward, the controller 181 may control the driving unit 150 to move the main body 110 backward in a straight line, and, when moving the main body forward, the controller 181 may control the driving unit 150 to move the main body 110 forward so that the main body 110 is brought into a second contact state in which the front end of the cleaning unit 120 is in contact with the obstacle b again.

Figure 10C:
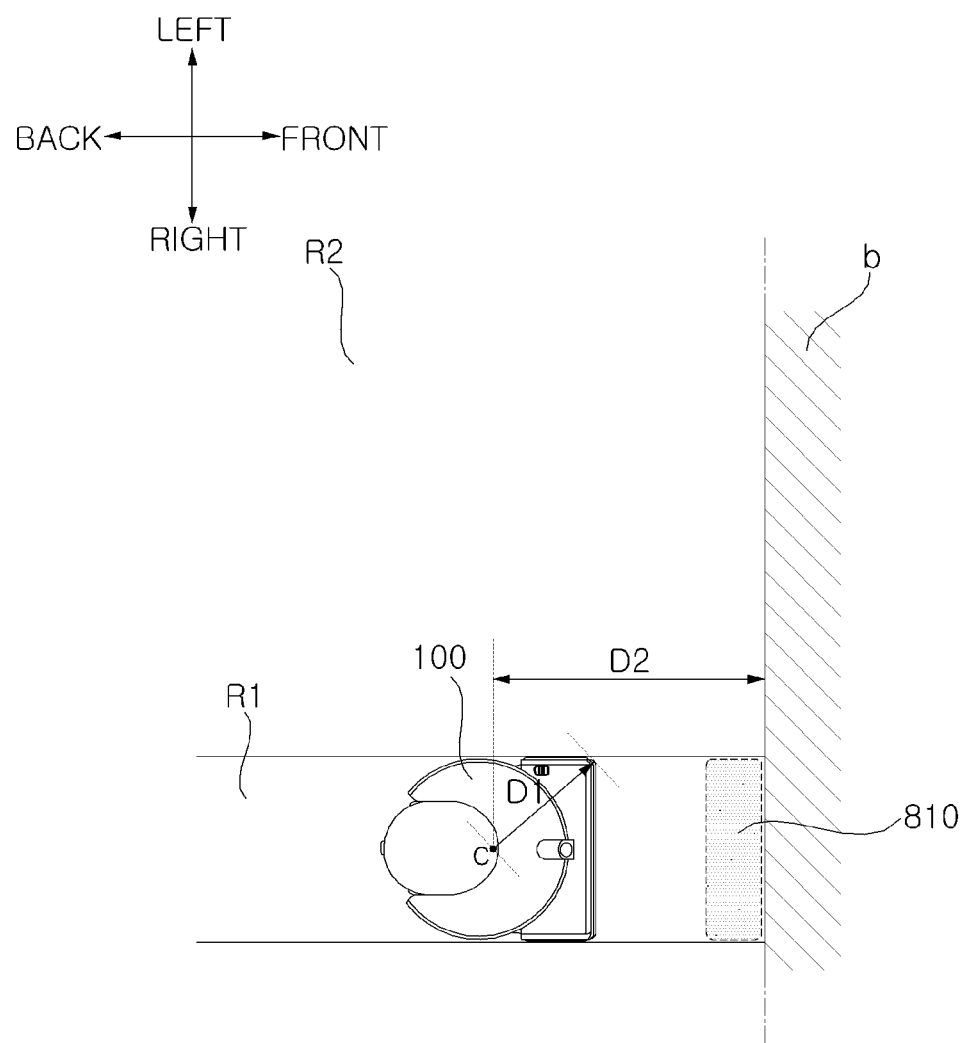

More specifically, in FIG. 10C, after the first contact state, the controller 181 may control the driving unit 150 so as to change a direction of rotation of the main wheels 111*a*. In addition, the controller 181 may set the same rotational speed for the main wheels 111*a* so as to move the main body 110 backward in a straight line. As a result, the main body 110 moves backward in a straight lie toward the cleaned region R1.

The controller 181 may move the main body 110 backward in a straight line toward the cleaned region R1.

Specifically, the controller 181 may move the main body 110, so that the distance D2 between the center C of rotation of the main body 110 in place and the obstacle b is greater than the maximum distance D1 between the center C of rotation of the main body 110 in place and the outermost line of the robot cleaner 100. This aims to avoid collision with the object b when the main body 110 rotates in place, as shown in FIG. 9C. Even in this case, it is preferable that the distance D2 between the center C of rotation and the obstacle b is set to be a distance within which the sensing unit 130 is allowed to sense an object.

Figure 10D:
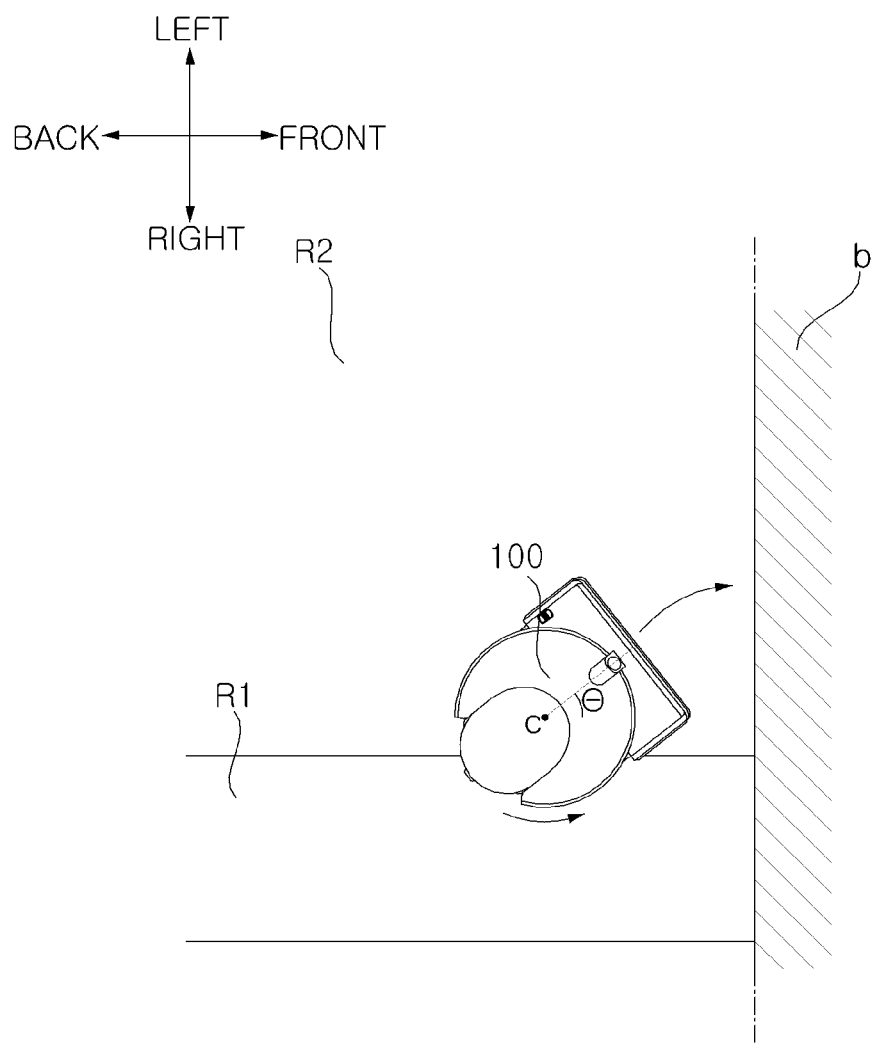

In FIG. 10D, at the final point of backward movement of the main body 110, the controller 181 may set a start angle θ of the main body 110 based on whether or not the first region 810 and the second region 830 overlap each other.

For example, if the start angle θ of the main body 110 becomes smaller at the final point of backward movement of the main body 110, the area where the first region 810 and the second region 830 overlap each other may become wider.

Figure 10E:
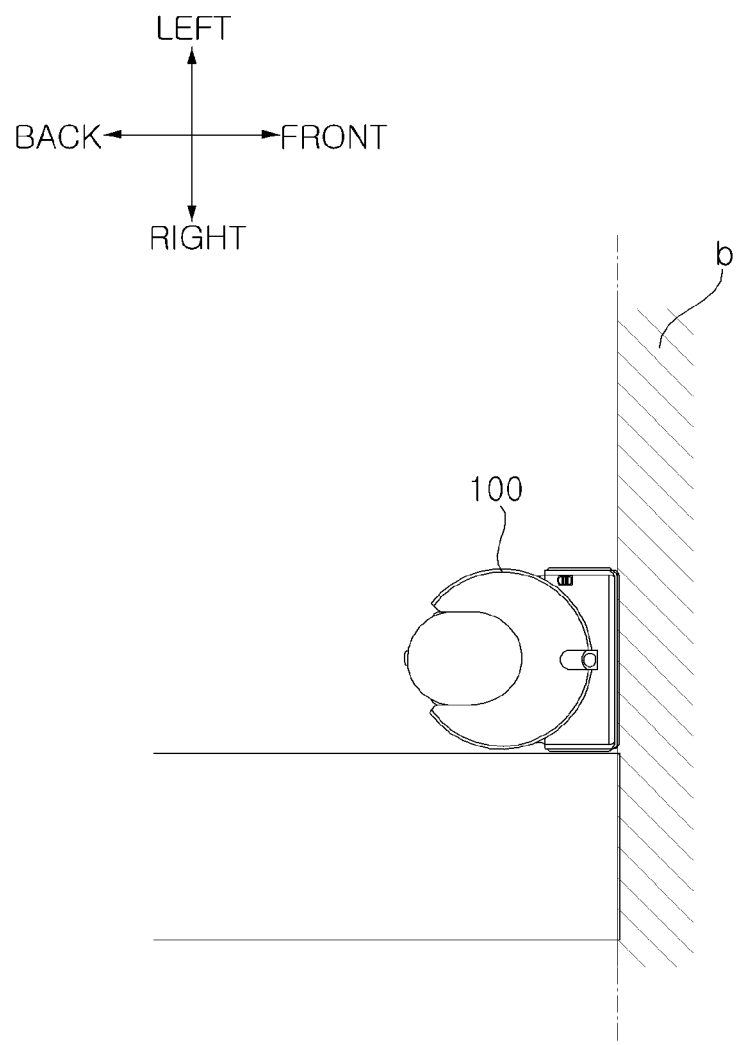
Figure 10F:
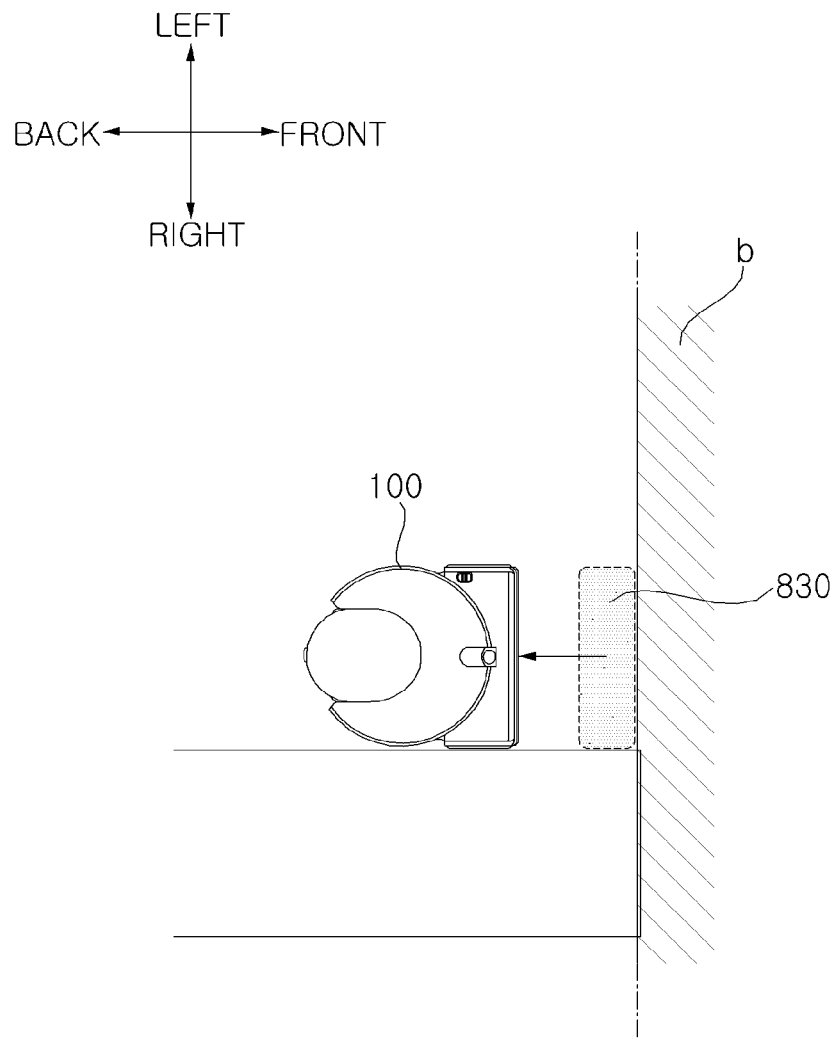

In FIG. 10E, the controller 181 may move the main body 110 forward so that the main body 110 is brought into a second contact state in which the front end of the cleaning unit 120 cleans the second region 810 while in contact with the obstacle b. In addition, as shown in FIG. 10F, after the second contact state, the controller 181 may repeatedly perform the above-described connecting operation by taking into account a width of the obstacle b and the like.

Meanwhile, the connecting operation described with reference to FIGS. 10C to 10F enables the main body 110 to move backward in a straight line, and thus, it is easy to control the main body 110. On the other hand, the connecting operation described with reference to FIGS. 9C to 9E is an operation of moving the main body 110 in a curved manner in a direction in which a non-cleaned region is present, and this may minimize an overlapping area to be cleaned, thereby reducing a cleaning time and enabling intensive cleaning of a boundary of an obstacle effectively.

Meanwhile, the above-described operation in FIGS. 9A-9E and 10A-10F may be referred to as an obstacle boundary intensive cleaning travel since the robot leaner 100 intensively cleans the obstacle b. Alternatively, the above-described operation in FIGS. 9A-9E and 10A-10F may be referred to as a step following travel since the robot cleaner 100 travels with following a step equal to or lower than a predetermined height.

Meanwhile, in FIGS. 9A-9E and 10A-10F, when the main body 110 approaches the obstacle b, the controller 110 may control the driving unit 150 to reduce a rotational speed of the main wheels 151a linearly in order to prevent the robot cleaner 100 from colliding with the obstacle b.

In addition, when the main body 110 moves away from the obstacle b, the controller 181 may control the driving unit 150 to increase a rotational speed of the main wheels 151a in order to reduce a cleaning time.

In addition, in the first contact state and the second contact state, the controller 181 may control a motor or the like to increase a suction force of the suction unit 120 or a rotational speed of a spin mop in order to effectively remove dust present in the boundary of the obstacle b.

In addition, when the main body 110 moves away from the obstacle b, the controller 181 may control a motor or the like to decrease a suction force of the suction unit 120 or a rotational speed of the spin mop in order to reduce power consumption.

FIGS. 11A, 11B, 12A-12C, and 13A-13C are diagrams for explanation of the first region and the second region described in FIG. 7.

Figure 11A:
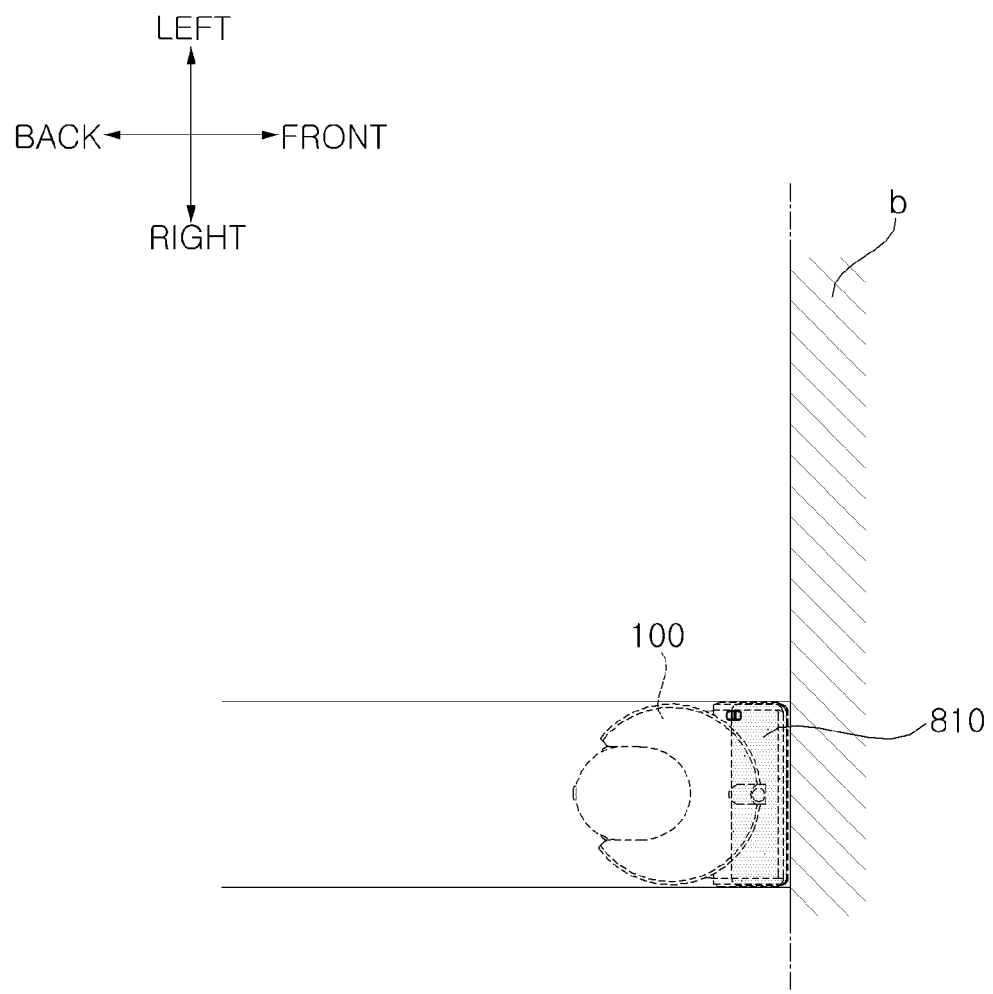
FIGS. 11A and 11B are diagrams for explanation of a first region and a second region shown in FIG. 7.
Figure 11B:
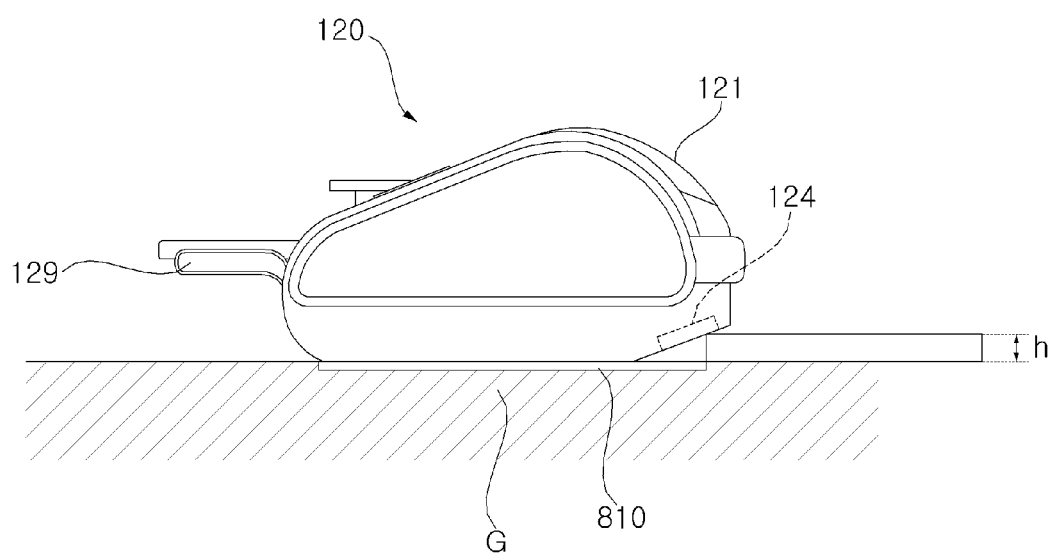

Referring to the drawings, the sensing unit 130 may sense height information related to a height h of an obstacle b in FIGS. 11A and 11B. When the height h of the obstacle b is determined based on the height information to be equal to or lower than a predetermined height, the controller 181 may control the driving unit 150 to move the main body 110 forward so that the main body 110 is brought into a first contact state in which the front end of the cleaning unit 120 cleans a first area while in contact with the obstacle b.

Meanwhile, it is illustrated that the inclined part 120a is in contact with the obstacle b in FIG. 11B, but a portion to come into contact with the obstacle b may differ depending on a structure of the cleaning unit 120.

After the first contact state, the controller 181 may control each element to enable the robot cleaner 100 to perform a predetermined connecting operation.

For example, when the sensing unit 130 senses a step of 3 cm or less, the controller 181 may control the driving unit 150 so that the robot cleaner 100 is brought into the first contact state, and, after the first contact state, the controller 181 may perform control so that the robot cleaner 100 performs a predetermined connecting operation.

Figure 13A:
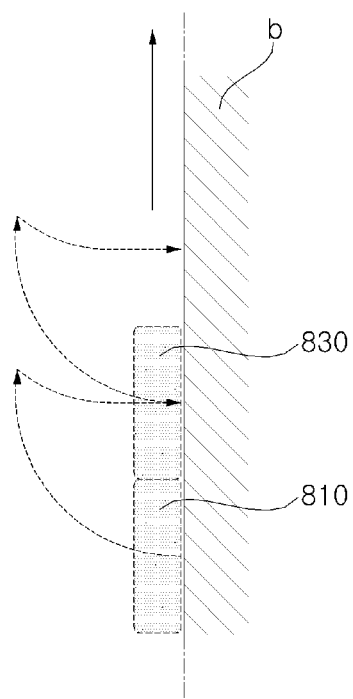
FIGS. 13A and 13B are diagrams for explanation of a first region and a second region described in FIG. 7.
Figure 13B:
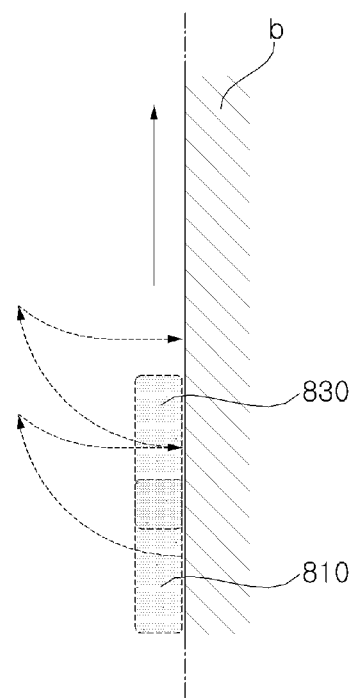

In FIGS. 13A and 13B, according to a predetermined connecting operation, the controller 181 may move the main body 110 forward so that the main body 110 is brought into a second contact state in which the front end of the cleaning unit 120 cleans a second region 830 while in contact with the obstacle b.

The controller 181 may perform control so that the first region 810 and the second region 820 are arranged along the outline of the obstacle b.

Specifically, in FIG. 13A, the controller 181 may move the main body 110 so that the first region 810 and the second region 830 are connected to each other. Alternatively, as shown in FIG. 13B, the controller 181 may move the main body 110 so that the first region 810 and the second region 830 partially overlap each other.

Here, the description that the first region 810 and the second region 830 are connected to each other may indicate the case where the outermost line of the first region 810 and the outermost line of the second region 830 are in contact with each other.

Depending on whether or not the first region 810 and the second region 830 are connected or overlap each other, the controller 181 may vary a radius of rotation of the main body 110 when moving the main body 110 backward.

For example, in the case where only a radius of rotation of the main body 110 is varied while a center of rotation of the main body 110 is maintained, if the radius of rotation of the main body 110 decreases, the first region 810 and the second region 830 may become to overlap. In addition, if the radius of rotation of the main body 110 increases, the first region 810 and the second region 830 may become connected to each other. However, even in the case where the radius of rotation of the main body 110 is increased, the controller 181 needs to vary the radius of rotation to at least connect the first region 810 and the second region 830 to each other so that the boundary of the obstacle b is thoroughly cleaned.

The robot cleaner 100 may perform a predetermined connecting operation at least one time, so that the first region 810 and the second region 830 are arranged along the outline of the obstacle b.

Figure 12A:
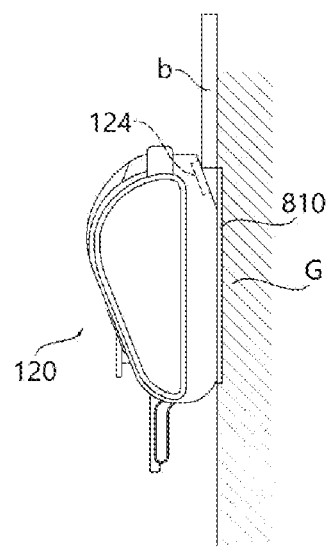
FIGS. 12A-12C are diagrams for explanation of a first region and a second region described in FIG. 7.

Meanwhile, as shown in FIG. 12A, each of the first region 810 and the second region 830 may be a region occupied by the cleaning unit 120 when the cleaning unit 120 is in contact with the obstacle b.

More specifically, as shown in FIGS. 10C, 10F, and 11A, each of the first region 810 and the second region 830 may be a region of the floor G, which appears to be occupied by the cleaning unit 120 from a top view perspective of the robot cleaner 100 when the cleaning unit 120 is in contact with the obstacle b.

Figure 12B:
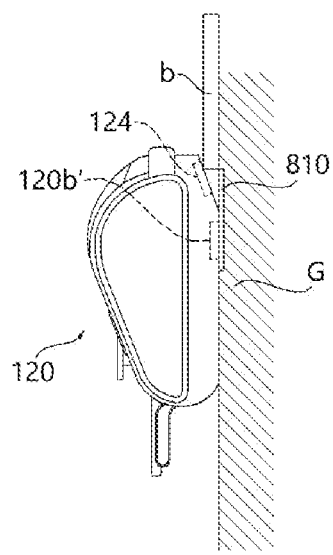

In another example, as shown in FIG. 12B, each of the first region 810 and the second region 830 may be a region from which dust can be wiped by the cleaner 120 to be introduced into the cleaner 120 when the cleaner 120 is in contact with an obstacle b.

Figure 12C:
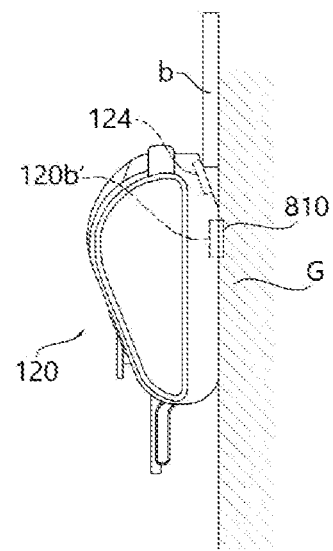

In yet another example, as shown in FIG. 12C, each of the first region 810 and the second region 830 may be a region in which the suction port 120$b'$ is positioned when the cleaning unit 120 is in contact with an obstacle b.

In yet another example, when the cleaning unit 120 includes a brush roller 126, each of the first region 810 and the second region 830 may be a region of the brush roller 126 in contact with the floor G.

If the robot cleaner 100 includes a suction port 120$b''$ on a bottom surface thereof, each of the first region 810 and the second region 830 may be a region of the floor G, which appears to be occupied by the suction port 120$b''$ from a top view perspective of the robot cleaner 100 when the suction port 120" is in contact with an obstacle b.

Figure 14:
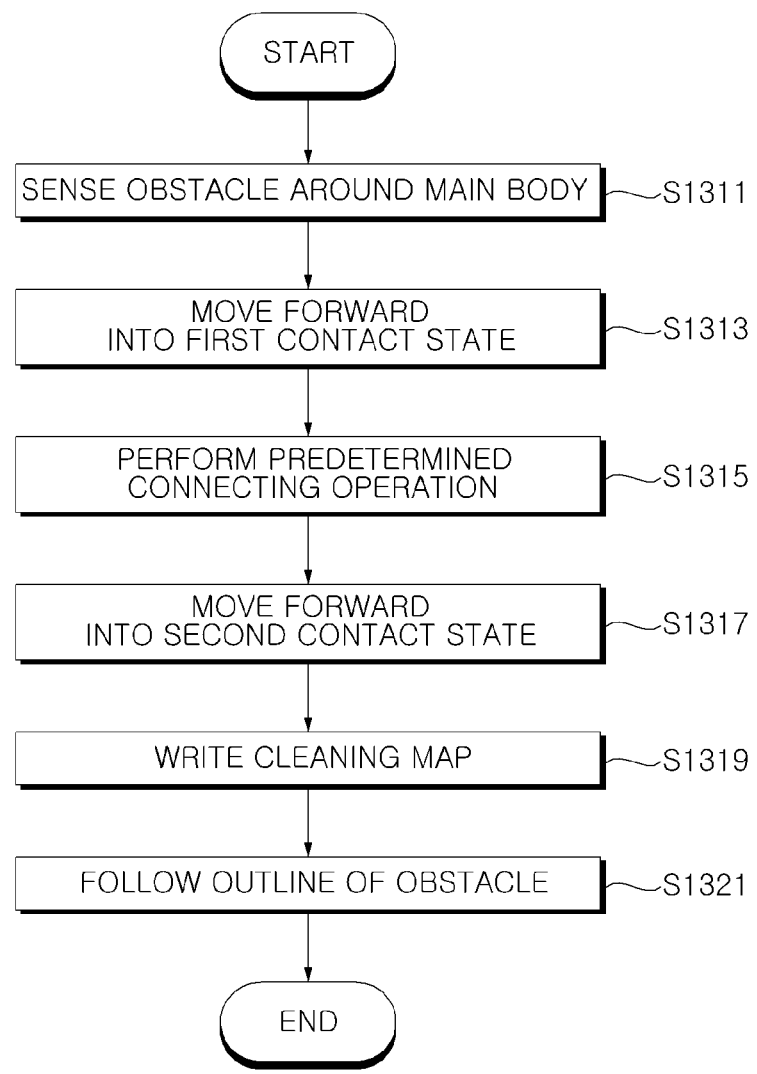
FIG. 14 is a flowchart illustrating a method for controlling a robot cleaner according to an embodiment of the present invention.
Figure 15A:
FIGS. 15A-15C are diagrams for explanation of the method shown in FIG. 14.
Figure 15A:
Figure 15A:
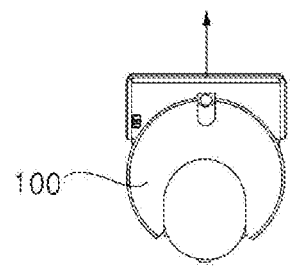
Figure 15B:
Figure 15B:
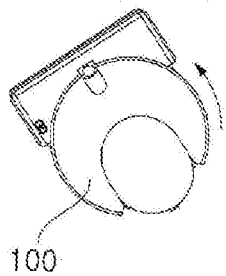
Figure 15C:
Figure 15C:
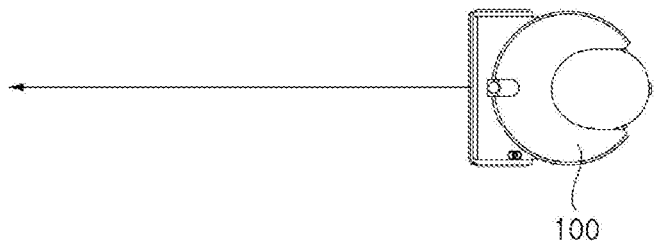

FIG. 14 is a flowchart illustrating a method for controlling a robot cleaner according to an embodiment of the present invention, and FIGS. 15A-15C are diagrams for explanation of the method shown in FIG. 14.

Referring to the drawings, steps S1311, S1313, S1315, and S1317 in FIG. 14 are identical to the steps S710, S730, S750, and S770 in FIG. 7. That is, in the case where the sensing unit 130 senses an obstacle b, the controller 181 may control the driving unit 150 to move the main body 110 forward to a first state in which the front end of the cleaning unit 120 cleans a first region 810 while in contact with the obstacle. After the first contact state, the controller 181 may control the driving unit 150 to move the main body 110 according to a predetermined connecting operation so that the main body 110 is brought into a second contact state in which the front end of the cleaning unit 120 cleans a second region 830 while in contact with the obstacle b. In this case, the first region 810 and the second region 830 may be controlled to be arranged along the outline of the obstacle b.

Meanwhile, the sensing unit 130 may sense location information of the obstacle b during the connecting operation. After intensive cleaning of the boundary of the obstacle b, the controller 181 may write a cleaning map of an area to be cleaned, based on the location information of the obstacle b sensed by the sensing unit 130 (S1319).

For example, during a connecting operation, the controller 181 may acquire information on an image of an obstacle, extract an outline of the obstacle from the information of the image, and reflect the outline in a cleaning map. However, a method of writing a cleaning map according to the present invention is not limited to the above example.

A cleaning map refers to a map of an area to be cleaned by the robot cleaner 100, and the cleaning map may include not just information on locations of various obstacles in the area to be cleaned, but also information on the outline of the obstacles.

The controller 181 may store the cleaning map in the memory 185. In addition, during traveling of the robot cleaner 100, the controller 181 may update the cleaning map based on acquired field data.

After the step of writing the cleaning map, the controller 181 may control the driving unit 150 so that the main body 110 approaches the obstacle b again based on the cleaning map again and moves along the outline of the obstacle b (S1321).

Specifically, when the robot cleaner 100 finishes intensive cleaning along the outline of the obstacle b, as shown in FIGS. 9A-9E and 10A-10F, the controller 181 may control the main body 110 to approach the obstacle b again based on the cleaning map.

Meanwhile, a position of approach in FIG. 15A and a position of approach in FIGS. 9A and 10A may be identical. That is, a position of initial approach and a position of re-approach of the robot leaner 100 may be identical.

In FIG. 15B, the controller 181 may control the driving unit 150 to match a direction of travel of the main body 110 with a direction of the outline of the obstacle b with maintaining a distance between the main body 110 and the obstacle b to a degree in which the main body 110 can rotate, and then the controller 181 rotate the main body 110.

At this point, a direction of the rotation of the main body 110 may be identical to a direction in which the second region 830 is formed when the connecting operations shown in FIGS. 9A-9E and 10A-10F are performed. FIG. 15B is a diagram illustrating that the main body 110 rotates in a left direction in correspondence with a direction in which the second region 830 is formed in FIGS. 9D and 10E.

In FIG. 15C, the controller 181 may control the driving unit 150 so that the robot cleaner 100 travels while maintaining a predetermined distance from a left side surface or a right side surface of the robot cleaner 100 to the outline of the obstacle b. FIG. 15C is a diagram illustrating the case where, in response to the leftward rotation shown in FIG. 15B, the robot cleaner 100 follows the boundary of the obstacle b while maintaining a predetermined distance between the right side surface of the robot cleaner 100 to the obstacle b.

In the case where the main body 110 travels while following the boundary of the obstacle b, the controller 181 may control the driving unit 150 to move at a speed slower than an average travel speed. In addition, the controller 181 may increase a suction force or a rotational speed of a spin mop. Accordingly, the boundary of the obstacle may be cleaned effectively.

Meanwhile, in the obstacle intensive cleaning step shown in FIGS. 9A-9E and 10A-10F, dust separated from the main wheels 111$a$ and the like by forward or backward movement of the main body 110 may be present in the first region 810 and the second region 830. However, the robot cleaner 100 approaches the obstacle b again and performs cleaning with following the outline of the obstacle b, and therefore, the boundary of the obstacle b may be cleaned thoroughly.

FIGS. 16A and 16B are reference diagrams for explanation of obstacle boundary cleaning by a conventional robot cleaner.

Referring to the drawings, a large amount of dust may be easily deposited in a boundary between an outline of a obstacle and a floor to be cleaned due to the structure of the boundary. In this case, the conventional robot cleaner travels with following the boundary of the obstacle.

However, the conventional robot cleaner is designed to allow any one side surface of the robot cleaner to follow an outline of the obstacle, and thus, at least one driving wheel of the robot cleaner frequently moves over the obstacle.

In this case, a suction port or a brush will be spaced apart from a floor, as shown in FIG. 16B, and thus dust cannot be suctioned in effect. Thus, the conventional robot cleaner may leave an area not allowed to be cleaned or a non-cleaned region 1510 along a boundary of an obstacle.

On the other hand, during intensive cleaning of a boundary of an obstacle, the front end of the cleaning unit 120 removes dust present at a boundary of an obstacle while in contact with the obstacle, and thus, an area not allowed to be cleaned does not exist.

In addition, a suction force to suction dust on the front surface of the cleaning unit 120 is greater than a suction force to suction dust on a side surface of the cleaning unit 120, and therefore, dust present in a boundary of an obstacle may be removed effectively.

In addition, after intensive cleaning of a boundary of an obstacle, the robot cleaner approaches the obstacle again and performs cleaning while following the boundary of the obstacle. Therefore, it is possible to remove dust separated from the main wheels 111*a* and the like and clean the boundary of the obstacle more thoroughly.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing are advantageous.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood without departing from the scope of the present disclosure.

What is claimed is:

1. A robot cleaner comprising:
   a main body;
   at least one main wheel configured to move the main body;
   a suction port assembly disposed at a front of the main body and configured to perform cleaning;
   at least one sensor configured to sense an obstacle around the main body and acquire information related to a height of the obstacle; and
   a controller configured to:
   when the at least one sensor senses the obstacle and the height of the obstacle, and the controller determines that the height of the obstacle is equal to or lower than a predetermined height, control the at least one main wheel to move the main body forward to bring the main body into a first contact state in which a front end of the suction port assembly cleans a first region while in contact with the obstacle,
   after moving the main body into the first contact state, control the at least one main wheel to move the main body backward in a straight line, and
   after moving the main body backward in the straight line, control the at least one main wheel to rotate the main body at a predetermined angle at a final point of backward movement and bring the main body into a second contact state in which the front end of the suction port assembly cleans a second region while in contact with the obstacle,
   wherein the first region and the second region are arranged along an outline of the obstacle.

2. The robot cleaner of claim 1, wherein the controller is further configured to control the at least one main wheel to move the main body so that the first region and the second region partially overlap each other or the first region and the second region are connected to each other.

3. The robot cleaner of claim 1, wherein the controller is further configured to move the main body backward in the straight line, so that a distance between a center of rotation of the main body and the obstacle is greater than a maximum distance between the center of rotation of the main body and an outermost line of the robot cleaner.

4. The robot cleaner of claim 1, wherein each of the first region and the second region is a region occupied by the suction port assembly when the suction port assembly is in contact with the obstacle.

5. The robot cleaner of claim 1, wherein the at least one sensor is further configured to
   sense location information of the obstacle while the main wheel is operated so that the body is rotated and the body is in the second contact state, and
   based on the location information of the obstacle, write a cleaning map of an area to be cleaned.

6. The robot cleaner of claim 5, further comprising a memory configured to store the cleaning map,
   wherein the controller is further configured to, based on the cleaning map, control the at least one main wheel so that the main body approaches the obstacle and moves along the outline of the obstacle.

7. A method for controlling a robot cleaner, comprising:
   sensing, using at least one sensor of the robot cleaner, an obstacle around the robot cleaner, and a height of the obstacle;
   when the obstacle is sensed and the height of the obstacle is determined to be equal to or lower than a predetermined height, moving, using at least one main wheel of the robot cleaner, the robot cleaner forward so that a main body of the robot cleaner is brought into a first contact state in which a front end of a suction port of the robot cleaner cleans a first region while in contact with the obstacle;
   after moving the robot cleaner into the first contact state, moving, using the at least one main wheel, the robot cleaner backward in a straight line; and
   after moving the main body backward in the straight line, rotating the main body at a predetermined angle at a final point of backward movement and moving the robot cleaner forward so that the main body of the robot cleaner is brought into a second contact state in which the front end of the suction port cleans a second region while in contact with the obstacle,
   wherein the second region partially overlaps the first region or the second region is connected to the first region.

8. The method of claim 7, further comprising sensing, using the at least one sensor, a location of the obstacle and writing a cleaning map of an area to be cleaned based on the location of the obstacle.

9. The method of claim 8, further comprising moving the robot cleaner along an outline of the obstacle based at least in part on the cleaning map.

* * * * *